United States Patent
Ma et al.

(10) Patent No.: US 11,606,177 B2
(45) Date of Patent: Mar. 14, 2023

(54) COMMUNICATION METHOD AND COMMUNICATION APPARATUS

(71) Applicant: HUAWEI TECHNOLOGIES CO., LTD., Guangdong (CN)

(72) Inventors: Ruixiang Ma, Beijing (CN); Yongxia Lyu, Ottawa (CA); Lei Guan, Beijing (CN); Xinghua Song, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/924,099

(22) Filed: Jul. 8, 2020

(65) Prior Publication Data

US 2020/0344026 A1 Oct. 29, 2020

Related U.S. Application Data

(63) Continuation of application No. PCT/CN2018/125808, filed on Dec. 29, 2018.

(30) Foreign Application Priority Data

Jan. 9, 2018 (CN) .......................... 201810020375.2

(51) Int. Cl.
*H04L 5/00* (2006.01)
*H04L 1/18* (2006.01)
(Continued)

(52) U.S. Cl.
CPC .......... *H04L 5/0053* (2013.01); *H04L 1/1861* (2013.01); *H04L 5/0094* (2013.01);
(Continued)

(58) Field of Classification Search
CPC ....... H04L 1/1861; H04L 5/00; H04L 5/0053; H04L 5/0094; H04W 72/04; H04W 72/0413; H04W 72/042; H04W 72/0446
See application file for complete search history.

(56) References Cited

U.S. PATENT DOCUMENTS

2012/0287848 A1 11/2012 Kim et al.
2017/0195999 A1 7/2017 Feng et al.
(Continued)

FOREIGN PATENT DOCUMENTS

CN 101651906 A 2/2010
CN 102625457 A 8/2012
(Continued)

OTHER PUBLICATIONS

Nokia et al.,"On resource allocation for PDSCH and PUSCH in NR", 3GPP TSG RAN WG1 Meeting 91, R1-1720479, Reno, NV, USA, Nov. 27-Dec. 1, 2017, total 13 pages.
(Continued)

*Primary Examiner* — Ayaz R Sheikh
*Assistant Examiner* — Debebe A Asefa
(74) *Attorney, Agent, or Firm* — Leydig, Voit & Mayer, Ltd.

(57) ABSTRACT

This application discloses communication methods and communication apparatuses. A terminal device receives indication information from a network device. The indication information includes one or more indication parameters. The terminal device obtains one or more pieces of configuration information based on the indication parameters. The terminal device performs uplink or downlink data transmission according to the one or more pieces of configuration information. Each pieces of configuration information includes information of a starting location and information of a quantity of time domain symbols in a slot that are occupied by uplink data or downlink data. Each piece of configuration information is selected from a first set of configuration information or a second set of configuration information. The first set of configuration information corresponds to a first mapping type of a physical downlink shared channel (PDSCH) and the second set of configuration (Continued)

information corresponds to a second mapping type of the PDSCH.

20 Claims, 5 Drawing Sheets

(51) Int. Cl.
    *H04W 72/04* (2009.01)
    *H04L 1/1829* (2023.01)
    *H04W 72/0446* (2023.01)

(52) U.S. Cl.
    CPC ..... *H04W 72/042* (2013.01); *H04W 72/0413* (2013.01); *H04W 72/0446* (2013.01)

(56) References Cited

U.S. PATENT DOCUMENTS

| | | | |
|---|---|---|---|
| 2019/0123792 A1* | 4/2019 | Murakami | H04L 5/00 |
| 2019/0222374 A1* | 7/2019 | Chen | H04L 5/00 |
| 2020/0059337 A1* | 2/2020 | Yamada | H04W 72/0446 |

FOREIGN PATENT DOCUMENTS

| | | |
|---|---|---|
| CN | 102740473 A | 10/2012 |
| CN | 103378962 A | 10/2013 |
| CN | 103391563 A | 11/2013 |
| CN | 105790814 A | 7/2016 |
| CN | 106332286 A | 1/2017 |
| CN | 107231218 A | 10/2017 |
| CN | 107426819 A | 12/2017 |
| RU | 2580792 C2 | 4/2016 |
| WO | 2017180179 A1 | 10/2017 |

OTHER PUBLICATIONS

ZTE et al.,"Considerations on resource allocation issues", 3GPP TSG RAN WG1 Meeting 91, R1-1719491, Reno, USA, Nov. 27-Dec. 1, 2017, total 2 pages.

3GPP TS 38.211 V15.0.0 (Dec. 2017) 3rd Generation Partnership Project;Technical Specification Group Radio Access Network;NR;Physical channels and modulation(Release 15), total 73 pages.

3GPP TS 38.214 V15.0.0 (Dec. 2017),3rd Generation Partnership Project;Technical Specification Group Radio Access Network;NR;Physical layer procedures for data (Release 15), total 71 pages.

3GPP TS 38.331 V15.0.0 (Dec. 2017),3rd Generation Partnership Project;Technical Specification Group Radio Access NetworkNR-Radio Resource Control (RRC) protocol specification(Release 15), total 188 pages.

Ericsson,"On TBS Determination and DL/UL Resource Allocation",3GPP TSG RAN WG1 Meeting 91,R1-1719596, Reno, USA, Nov. 27-Dec. 1, 2017, total 11 pages.

MCC Support, "Draft Report of 3GPP TSG RAN WG1 #91 v0.2.0 (Reno, USA, Nov. 27-Dec. 1, 2017)," 3GPP TSG RAN WG1 Meeting #92, Athens, Greece, R1-180xxxx, total 208 pages, 3rd Generation Partnership Project, Valbonne, France (Feb. 26-Mar. 2, 2018).

Ericsson, "Outcome of offline discussion on 7.3.3.1.," TSG-RAN WG1 #91, Reno, NV, US, R1-1721719, total 3 pages, (Nov. 27-Dec. 1, 2017).

Ericsson, "Summary of offline session on 7.3.3.1 (resource allocation)," TSG-RAN WG1 #91, Reno, NV, US, R1-1721488, total 21 pages (Nov. 27-Dec. 1, 2017).

LG Electronics, "Discussion on resource allocation and TBS determination," 3GPP TSG RAN WG1 Meeting 90bis , Prague, CZ, R1-1717965, Total 18 pages, 3rd Generation Partnership Project, Valbonne, France (Oct. 9-13, 2017).

* cited by examiner

COMMUNICATION METHOD AND COMMUNICATION APPARATUS

CROSS-REFERENCE TO RELATED APPLICATIONS

This application is a continuation of International Patent Application No. PCT/CN2018/125808, filed on Dec. 29, 2018, which claims priority to Chinese Patent Application No. 201810020375.2, filed on Jan. 9, 2018. The disclosures of the aforementioned applications are hereby incorporated by reference in their entireties.

TECHNICAL FIELD

This application relates to the field of mobile communication technologies, and in particular, to a communication method and a communication apparatus.

BACKGROUND

In a New Radio (NR) communication system, data is transmitted in slots. One slot includes 14 orthogonal frequency division multiplexing (OFDM) symbols. In addition, in the NR communication system, a physical downlink shared channel (PDSCH) may occupy some OFDM symbols in one slot to perform downlink data transmission. For example, the PDSCH may occupy two OFDM symbols in one slot to perform downlink data transmission. Likewise, a physical uplink shared channel (PUSCH) may also occupy some OFDM symbols in one slot to perform uplink data transmission. For example, the PUSCH may occupy seven OFDM symbols in one slot to perform uplink data transmission.

In the existing technology, a base station may configure different combinations of S (starting position of an OFDM symbol occupied by uplink/downlink data in one slot) and L (length/quantity of OFDM symbols occupied by the uplink/downlink data in one slot) for different terminal devices, to perform uplink/downlink data transmission. According to certain standards, each terminal can support a maximum of 16 combinations of S and L. Currently, there is no corresponding solution to how the base station can configure the 16 combinations of S and L for the terminal device.

SUMMARY

Embodiments in this application provide communication methods and communication apparatuses for a network device to configure, for different terminal devices, starting location S of time domain symbols occupied by uplink data or downlink data and quantity L of the occupied time domain symbols.

According to a first aspect, a communication method is provided. The method includes: determining M pieces of first information, where the first information includes information of starting location S of time domain symbols occupied by uplink data or downlink data, and quantity L of the occupied time domain symbols, and S, L, and M each are an integer; and sending first indication information, where the first indication information includes M indication parameters, each indication parameter is represented by seven bits, and the M indication parameters correspond to the M pieces of first information.

According to a second aspect, a communication method is provided. The method includes: determining M pieces of first information, where the M pieces of first information are in a subset of N pieces of first information, N is an integer less than or equal to 64, the first information includes starting location information S of time domain symbols occupied by uplink data or downlink data and quantity information L of the occupied time domain symbols, and S, L, and M each are an integer; and sending first indication information, where the first indication information includes M indication parameters, each indication parameter is represented by six bits, and the M indication parameters correspond to the M pieces of first information.

In a possible implementation of the second aspect, values of L corresponding to the N pieces of first information include one or more values in 1 to 14, and the one or more values include at least one of 1, 2, 4, 7, and 14.

In a possible implementation of the second aspect, the method further includes: sending second indication information, where the second indication information is used to indicate the values of L included in the N pieces of first information.

In a possible implementation of the second aspect, the second indication information includes Y bits, each of the Y bits is used to indicate whether there is a corresponding value of L in the N pieces of first information, and Y is a positive integer.

In a possible implementation of the second aspect, the M indication parameters are M indication values, and that the M indication parameters correspond to the M pieces of first information includes: if (L−1) is less than or equal to 7, an indication value corresponding to the first information is 14×(L−1)+S; or if (L−1) is greater than 7, the indication value corresponding to the first information is 14×(14−L+1)+(14−1−S), where L is greater than 0 and less than or equal to (14−S), and S is greater than or equal to 0 and less than or equal to 13.

In a possible implementation of the second aspect, the M indication parameters are M indexes, and that the M indication parameters correspond to the M pieces of first information includes: the M pieces of first information correspond to M indication values; and the M indexes correspond to the M indication values, the M indexes are in a subset of X indexes, the M indication values are in a subset of X indication values, the X indexes correspond to the X indication values, at least one index of the X indexes is respectively different from at least one indication value corresponding to the at least one index, and X is a positive integer.

In a possible implementation of the second aspect, that the M pieces of first information correspond to M indication values includes: if (L−1) is less than or equal to 7, an indication value corresponding to the first information is 14×(L−1)+S; or if (L−1) is greater than 7, the indication value corresponding to the first information is 14×(14−L+1)+(14-1-S); or if (L−1) is less than 7, an indication value corresponding to the first information is 14×(L−1)+S; or if (L−1) is greater than or equal to 7, the indication value corresponding to the first information is 14×(14−L+1)+(14−1−S), where L is greater than 0 and less than or equal to (14−S), and S is greater than or equal to 0 and less than or equal to 13.

According to a third aspect, a communication method is provided. The method includes: receiving first indication information, where the first indication information includes M indication parameters, and each indication parameter is represented by seven bits; and determining M pieces of first information, where the M pieces of first information correspond to the M indication parameters, the first information includes starting location information S of time domain symbols occupied by uplink data or downlink data and quantity information L of the occupied time domain symbols, and S, L, and M each are an integer.

According to a fourth aspect, a communication method is provided. The method includes: receiving first indication information, where the first indication information includes M indication parameters, and each indication parameter is represented by six bits; and determining M pieces of first information, where the M pieces of first information correspond to the M indication parameters, the M pieces of first information are in a subset of N pieces of first information, N is an integer less than or equal to 64, the first information includes starting location information S of time domain symbols occupied by uplink data or downlink data and quantity information L of the occupied time domain symbols, and S, L, and M each are an integer.

In a possible implementation of the fourth aspect, values of L corresponding to the N pieces of first information include one or more values in 1 to 14, and the one or more values include at least one of 1, 2, 4, 7, and 14.

In a possible implementation of the fourth aspect, the method further includes: receiving second indication information, where the second indication information is used to indicate the values of L included in the N pieces of first information.

In a possible implementation of the fourth aspect, the second indication information includes Y bits, each of the Y bits is used to indicate whether there is a corresponding value of L in the N pieces of first information, and Y is a positive integer.

In a possible implementation of the fourth aspect, the M indication parameters are M indication values, and that the M pieces of first information correspond to the M indication parameters includes: if (L−1) is less than or equal to 7, an indication value corresponding to the first information is 14×(L−1)+S; or if (L−1) is greater than 7, the indication value corresponding to the first information is 14×(14−L+1)+(14−1−S), where L is greater than 0 and less than or equal to (14−S), and S is greater than or equal to 0 and less than or equal to 13.

In a possible implementation of the fourth aspect, the M indication parameters are M indexes, and that the M pieces of first information correspond to the M indication parameters includes: the M indexes correspond to M indication values, the M pieces of first information correspond to the M indication values, the M indexes are in a subset of X indexes, the M indication values are in a subset of X indication values, the X indexes correspond to the X indication values, at least one index of the X indexes is respectively different from at least one indication value corresponding to the at least one index, and X is a positive integer.

In a possible implementation of the fourth aspect, that the M pieces of first information correspond to M indication values includes: if (L−1) is less than or equal to 7, an indication value corresponding to the first information is 14×(L−1)+S; or if (L−1) is greater than 7, the indication value corresponding to the first information is 14×(14−L+1)+(14−1−S); or if (L−1) is less than 7, an indication value corresponding to the first information is 14×(L−1)+S; or if (L−1) is greater than or equal to 7, the indication value corresponding to the first information is 14×(14−L+1)+(14−1−S), where L is greater than 0 and less than or equal to (14−S), and S is greater than or equal to 0 and less than or equal to 13.

According to a fifth aspect, a communication method is provided. The method includes: generating, by a network device, first indication information, where the first indication information is used to indicate one of a plurality of pieces of predefined time domain resource information, and each piece of time domain resource information includes at least one of a parameter K, a parameter S, a parameter L, and a mapping type parameter of uplink data or downlink data, or each piece of time domain resource information includes at least one of a parameter K, an indication parameter, and a mapping type parameter of uplink data or downlink data, where the parameter K is used to represent a starting slot location occupied by the uplink data or the downlink data, the parameter S is used to represent a starting location of time domain symbols occupied by the uplink data or the downlink data, the parameter L is used to represent a quantity of time domain symbols occupied by the uplink data or the downlink data, the mapping type parameter is used to represent a mapping type of the uplink data or the downlink data, and the indication parameter is used to represent a starting location of time domain symbols occupied by the uplink data or the downlink data and a quantity of occupied time domain symbols; and sending, by the network device, the first indication information.

In a possible implementation of the fifth aspect, when the time domain resource information includes the parameter L, there are at least three pieces of predefined time domain resource information, and parameters L in the at least three pieces of time domain resource information are two time domain symbols, four time domain symbols, and seven time domain symbols.

In a possible implementation of the fifth aspect, when the time domain resource information includes the parameter L, there are four pieces of predefined time domain resource information, parameters L in the four pieces of time domain resource information are two time domain symbols, four time domain symbols, seven time domain symbols, and i time domain symbols, and i is a positive integer greater than or equal to 7.

In a possible implementation of the fifth aspect, when the time domain resource information includes the parameter S, the parameter S is predefined.

In a possible implementation of the fifth aspect, S is predefined as 0.

In a possible implementation of the fifth aspect, when the time domain resource information includes the parameter K, the parameter K is predefined.

In a possible implementation of the fifth aspect, the parameter K is predefined as 0.

In a possible implementation of the fifth aspect, when the time domain resource information includes the indication parameter, and there are four pieces of predefined time domain resource information, indication parameters in the four pieces of time domain resource information are V1, V2, V3, and V4, and V1, V2, V3, and V4 each are a positive number.

In a possible implementation of the fifth aspect, when a value of V1 is 0, it indicates that the starting location of the time domain symbols occupied by the uplink data or the downlink data is 0 and that the quantity of occupied time domain symbols is 2. When a value of V2 is 1, it indicates that the starting location of the time domain symbols occupied by the uplink data or the downlink data is 0 and that the quantity of occupied time domain symbols is 4. When a value of V3 is 84, it indicates that the starting location of the time domain symbols occupied by the uplink data or the downlink data is 0 and that the quantity of occupied time domain symbols is 7. When a value of V4 is 27, it indicates that the starting location of the time domain symbols occupied by the uplink data or the downlink data is 0 and that the quantity of occupied time domain symbols is 14.

In a possible implementation of the fifth aspect, when the time domain resource information includes the indication parameter, and there are at least three pieces of predefined time domain resource information, indication parameters in the at least three pieces of time domain resource information are V, V2, and V3, where V1, V2, and V3 each are a positive number.

In a possible implementation of the fifth aspect, when a value of V1 is 0, it indicates that the starting location of the time domain symbols occupied by the uplink data or the downlink data is 0 and that the quantity of occupied time domain symbols is 2. When a value of V2 is 1, it indicates that the starting location of the time domain symbols occupied by the uplink data or the downlink data is 0 and that the quantity of occupied time domain symbols is 4. When a value of V3 is 84, it indicates that the starting location of the time domain symbols occupied by the uplink data or the downlink data is 0 and that the quantity of occupied time domain symbols is 7.

In a possible implementation of the fifth aspect, when the time domain resource information includes the mapping type parameter, and there are four pieces of predefined time domain resource information, mapping type parameters in the four pieces of time domain resource information are type 1, type 1, type 1, and type 2, and type 1 is different from type 2.

In a possible implementation of the fifth aspect, when the time domain resource information includes the mapping type parameter, and there are at least three pieces of predefined time domain resource information, mapping type parameters in the at least three pieces of time domain resource information are type 1, type 1, and type 1.

According to a sixth aspect, a communication method is provided. The method includes: receiving, by a terminal device, first indication information, where the first indication information is used to indicate one of a plurality of pieces of predefined time domain resource information, and each piece of time domain resource information includes at least one of a parameter K, a parameter S, a parameter L, and a mapping type parameter of uplink data or downlink data, or each piece of time domain resource information includes at least one of a parameter K, an indication parameter, and a mapping type parameter of uplink data or downlink data, where the parameter K is used to represent a starting slot location occupied by the uplink data or the downlink data, the parameter S is used to represent a starting location of time domain symbols occupied by the uplink data or the downlink data, the parameter L is used to represent a quantity of time domain symbols occupied by the uplink data or the downlink data, the mapping type parameter is used to represent a mapping type of the uplink data or the downlink data, and the indication parameter is used to represent a starting location of time domain symbols occupied by the uplink data or the downlink data and a quantity of occupied time domain symbols; and determining, by the terminal device, time domain resource information of the uplink data or the downlink data according to the first indication information.

In a possible implementation of the sixth aspect, when the time domain resource information includes the parameter L, there are at least three pieces of predefined time domain resource information, and parameters L in the at least three pieces of time domain resource information are two time domain symbols, four time domain symbols, and seven time domain symbols.

In a possible implementation of the sixth aspect, when the time domain resource information includes the parameter L, there are four pieces of predefined time domain resource information, parameters L in the four pieces of time domain resource information are two time domain symbols, four time domain symbols, seven time domain symbols, and i time domain symbols, and i is a positive integer greater than or equal to 7.

In a possible implementation of the sixth aspect, when the time domain resource information includes the parameter S, the parameter S is predefined.

In a possible implementation of the sixth aspect, S is predefined as 0.

In a possible implementation of the sixth aspect, when the time domain resource information includes the parameter K, the parameter K is predefined.

In a possible implementation of the sixth aspect, the parameter K is predefined as 0.

In a possible implementation of the sixth aspect, when the time domain resource information includes the indication parameter, and there are four pieces of predefined time domain resource information, indication parameters in the four pieces of time domain resource information are V1, V2, V3, and V4, and V1, V2, V3, and V4 each are a positive number.

In a possible implementation of the sixth aspect, when a value of V1 is 0, it indicates that the starting location of the time domain symbols occupied by the uplink data or the downlink data is 0 and that the quantity of occupied time domain symbols is 2. When a value of V2 is 1, it indicates that the starting location of the time domain symbols occupied by the uplink data or the downlink data is 0 and that the quantity of occupied time domain symbols is 4. When a value of V3 is 84, it indicates that the starting location of the time domain symbols occupied by the uplink data or the downlink data is 0 and that the quantity of occupied time domain symbols is 7. When a value of V4 is 27, it indicates that the starting location of the time domain symbols occupied by the uplink data or the downlink data is 0 and that the quantity of occupied time domain symbols is 14.

In a possible implementation of the sixth aspect, when the time domain resource information includes the indication parameter, and there are at least three pieces of predefined time domain resource information, indication parameters in the at least three pieces of time domain resource information are V, V2, and V3, where V1, V2, and V3 each are a positive number.

In a possible implementation of the sixth aspect, when a value of V1 is 0, it indicates that the starting location of the time domain symbols occupied by the uplink data or the downlink data is 0 and that the quantity of occupied time domain symbols is 2. When a value of V2 is 1, it indicates that the starting location of the time domain symbols occupied by the uplink data or the downlink data is 0 and that the quantity of occupied time domain symbols is 4. When a value of V3 is 84, it indicates that the starting location of the time domain symbols occupied by the uplink data or the downlink data is 0 and that the quantity of occupied time domain symbols is 7.

In a possible implementation of the sixth aspect, when the time domain resource information includes the mapping type parameter, and there are four pieces of predefined time domain resource information, mapping type parameters in the four pieces of time domain resource information are type 1, type 1, type 1, and type 2, and type 1 is different from type 2.

In a possible implementation of the sixth aspect, when the time domain resource information includes the mapping type parameter, and there are at least three pieces of predefined time domain resource information, mapping type parameters in the at least three pieces of time domain resource information are type 1, type 1, and type 1.

According to a seventh aspect, a communication method is provided, including: determining, by a network device, M pieces of first information, where $M_i$ pieces of first information in the M pieces of first information are in a subset of an $i^{th}$ first-information set, the $i^{th}$ first-information set is an i first-information set in P first-information sets, a quantity of pieces of first information included in each of the P first-information sets is less than or equal to 64, the first information includes starting location information S of time domain symbols occupied by uplink data or downlink data and quantity information L of the occupied time domain symbols, S, L, M, i, and P each are a positive integer or a non-negative integer, i≤P, and $\Sigma_{i=1}^{P} M_i = M$; and sending, by the network device, first indication information, where the first indication information includes M indication parameters, and $M_i$ indication parameters in the M indication parameters are in a one-to-one correspondence with the $M_i$ pieces of first information in the M pieces of first information.

According to an eighth aspect, a communication method is provided, including: receiving, by a terminal device, first indication information, where the first indication information includes M indication parameters; and determining, by the terminal device, M pieces of first information, where $M_i$ pieces of first information in the M pieces of first information are in a one-to-one correspondence with $M_i$ indication parameters in the M indication parameters; where the $M_i$ pieces of first information are in a subset of an $i^{th}$ first-information set, the $i^{th}$ first-information set is an $i^{th}$ first-information set in P first-information sets, a quantity of pieces of first information included in each of the P first-information sets is less than or equal to 64, the first information includes starting location information S of time domain symbols occupied by uplink data or downlink data and quantity information L of the occupied time domain symbols, S, L, M, i, and P each are a positive integer or a non-negative integer, i≤P, and $\Sigma_{i=1}^{P} M_i = M$.

In a possible implementation of the eighth aspect, values of L corresponding to first information included in at least one of the P first-information sets include one or more values in 1 to 14, and the one or more values include at least one of 1, 2, 4, 7, and 14.

In a possible implementation of the eighth aspect, the M indication parameters are M indication values; and that $M_i$ pieces of first information in the M indication parameters are in a one-to-one correspondence with the $M_i$ pieces of first information in the M pieces of first information includes: when (L−1) is less than or equal to 7, an indication value corresponding to the first information is 14×(L−1)+S; or when (L−1) is greater than 7, the indication value corresponding to the first information is 14×(14−L+1)+(14−1−S), where L is an integer greater than 0 and less than or equal to (14−S), and S is an integer greater than or equal to 0 and less than or equal to 13.

In a possible implementation of the eighth aspect, P is predefined, and P=2.

In a possible implementation of the eighth aspect, the first indication information is carried in higher layer signaling.

According to a ninth aspect, a communication apparatus is provided, and is used in a network device, where the communication apparatus includes units or means (means) configured to perform the steps in the first aspect, the second aspect, the fifth aspect, and the seventh aspect.

According to a tenth aspect, a communication apparatus is provided, and is used in a terminal device, where the communication apparatus includes units or means (means) configured to perform the steps in the third aspect, the fourth aspect, the sixth aspect, and the eighth aspect.

According to an eleventh aspect, this application provides a communication apparatus, including a processor and a memory. The memory is configured to store a computer executable instruction, and the processor is configured to execute the computer executable instruction stored in the memory, so that the communication apparatus performs the method in any one of the first aspect to the eighth aspect.

According to a twelfth aspect, this application provides a computer-readable storage medium, where the computer-readable storage medium stores an instruction, and when the instruction is run on a computer, the computer is enabled to perform the method in any one of the first aspect to the eighth aspect.

According to a thirteenth aspect, this application provides a chip, where the chip is connected to a memory, and is configured to read and perform a software program stored in the memory, so as to implement the method in any one of the first aspect to the eighth aspect.

According to a fourteenth aspect, this application provides a communication system, and the communication system includes the network device in any one of the first aspect, the second aspect, the fifth aspect, or the seventh aspect, and the terminal device in any one of the third aspect, the fourth aspect, the sixth aspect, or the eighth aspect.

According to a fifteenth aspect, a communication apparatus is provided, and is used in a network device, where the communication apparatus includes units or means configured to perform the steps in the first aspect, the second aspect, the fifth aspect, or the seventh aspect.

It may be learned from the foregoing descriptions that in the embodiments of this application, the network device first determines the M pieces of first information, and then sends the first indication information, where the M pieces of first information are the subset of the N pieces of first information, N is an integer less than or equal to 64, the first information includes the starting location information S of the time domain symbols occupied by the uplink data or the downlink data and the quantity information L of the occupied time domain symbol, and S, L, and M each are an integer; where the first indication information includes the M indication parameters, each indication parameter is represented by six bits, and the M indication parameters correspond to the M pieces of first information. According to the method and the apparatus in this application, the network device can configure a combination of S and L for the terminal device.

DETAILED DESCRIPTION OF EMBODIMENTS

Embodiments of this application provide communication methods and communication apparatuses, for a network device to configure, for different terminal devices, starting location S of time domain symbols occupied by uplink data or downlink data and quantity L of the occupied time domain symbols. The methods and the apparatuses are based on a same application concept. The method and the apparatus have similar problem-resolving principles. Therefore, for implementation of the apparatus and the method, refer to each other. Repeated parts are not described.

The following describes the technical solutions in the embodiments of this application with reference to the accompanying drawings.

Figure 1:
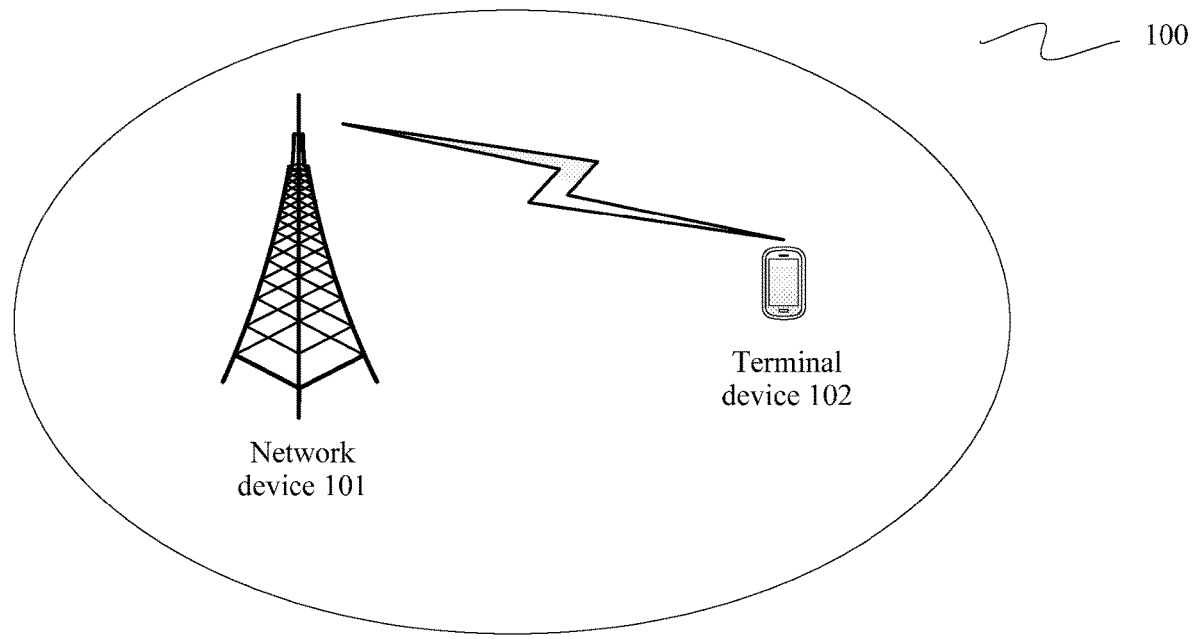
FIG. 1 is a schematic diagram of a communication system.

As shown in FIG. 1, a communication system 100 in which embodiments of this application can be applied includes a network device 101 and a terminal device 102.

The network device 101 is responsible for providing a radio access related service for the terminal device 102, and implements a radio physical layer function, a resource scheduling and radio resource management function, a quality of service (QoS) management function, a radio access control function, and a mobility management function.

The terminal device 102 is a device that accesses a network via the network device 101.

The network device 101 and the terminal device 102 are connected by using a Uu interface, to implement communication between the terminal device 102 and the network device 101.

In the embodiments of this application, the network device 101 may configure different time domain resources for the terminal device 102 to perform uplink data transmission and downlink data transmission. For example, the time domain resource information configured by the network device for the terminal device can be seen in the following Table 1.

TABLE 1

| Index | K0/K2 | (Start, length) | Mapping type |
|---|---|---|---|
| 1 | 0 | *** *** | **** |
| ... | ... | ... | ... |
| n | b | *** *** | **** |

The Index is a serial number of time domain resource configuration that is configurable by the network device 101 for the terminal device 102. Total number of index values is n. For example, a maximum value of n may be 16, and this means that the network device 101 may provide a maximum of 16 time domain resource configurations for the terminal device 102.

The network device may alternatively configure each column in Table 1 in an enumeration manner. For example, the network device configures the time domain resource information as follows:

K0/K2={k1, k2, k3, . . . , kn};
(Start, length)={s1, s2, s3, . . . , sn};
Mapping type={ . . . , Type j, . . . , Type i, . . . }, which are n types in total.

K0 indicates a starting location of a slot occupied by downlink data of a physical downlink data channel (PDSCH). K0 has four possible values, and needs to be indicated by the network device 101 using a 2-bit higher layer signaling, such as a radio resource control (RRC) signaling.

K2 indicates a starting location of a slot occupied by uplink data of a physical uplink data channel (PUSCH). K2 has eight possible values, and needs to be indicated by the network device 101 using a 3-bit higher layer signaling, such as a RRC signaling.

In (start, length), "start" represents a starting location of time domain symbols that are occupied by uplink data or downlink data in one slot, and "length" represents a quantity of time domain symbols that are occupied by the uplink data or the downlink data in the slot. For ease of description, "start" may be represented by S, and "length" may be represented by L below.

The mapping type may be used to indicate a PDSCH mapping type or a PUSCH mapping type. Specifically, in NR, there are two possible data mapping types: type 1 and type 2. Type 1 represents that a demodulation reference signal (DMRS) is mapped to the first symbol in a scheduled uplink data channel resource or the first symbol in a downlink data channel. Type 2 represents that the DMRS is mapped to the third symbol or the fourth symbol of a slot. One bit may be used to configure the PDSCH mapping type.

Based on the foregoing descriptions, this application provides a communication method, so as to enable the network device 101 to configure S and L information for the terminal device 102. For ease of understanding, some terms in this application are first explained. Details are as follows:

(1) Network Device: A network device is a device that is in a network and that connects a terminal device to the network. The network device may be a node in a radio access network, and may also be referred to as a base station, or a radio access network (RAN) node (or device). Examples of the network device include a fifth generation (5G) radio node (gNB), a transmission and reception point (TRP), an evolved NodeB (eNB), a radio network controller (RNC), a NodeB (NB), a base station controller (BSC), a base transceiver station (BTS), a home NodeB (for example, a home evolved NodeB or a home NodeB, HNB), a baseband unit (BBU), or a wireless fidelity (Wi-Fi) access point (AP). In addition, in a network structure, the network device may include a centralized unit (CU) node and a distributed unit (DU) node. In this structure, a protocol layer of an eNB in a long term evolution (LTE) system is split. Some functions of the protocol layer are controlled by the CU in a centralized manner, part or all remaining functions of the protocol layer are distributed in DUs, and the CU controls the DUs in a centralized manner.

(2) Terminal Device: A terminal device is also referred to as user equipment (UE), a mobile station (MS), a mobile terminal (MT), or the like. A terminal device is a device that provides voice and/or data connectivity for a user. For example, terminal device may be a handheld device or a vehicle-mounted device having a wireless connection function. Examples of the terminal include a mobile phone, a tablet computer, a notebook computer, a palmtop computer, a mobile Internet device (MID), a wearable terminal, a virtual reality (VR) device, an augmented reality (AR) device, a wireless terminal in industrial control, a wireless terminal in self driving, a wireless terminal in remote medical surgery, a wireless terminal in a smart grid, a wireless terminal in transportation safety, a wireless terminal in a smart city, or a wireless terminal in a smart home.

(3) Communication System: A communication system may be a system that uses one or more of various radio access technologies (RAT). For example, a communication system may be a code division multiple access (CDMA) system, a time division multiple access (TDMA) system, a frequency division multiple access (FDMA) system, an orthogonal frequency division multiple access (OFDMA) system, a single carrier frequency division multiple access (SC-FDMA) system, or the like. (The terms "system" and "network" may be interchangeably used in this application.) The CDMA system may implement radio access technologies such as universal terrestrial radio access (UTRA) and CDMA 2000. UTRA may be a wideband CDMA (WCDMA) technology or other variations of CDMA technology. CDMA 2000 may cover the interim standard (IS) 2000 (IS-2000), the IS-95 standard, and the IS-856 standard. A radio technology such as a global system for mobile communications (GSM) may be implemented in the TDMA system. A radio technology such as evolved universal terrestrial radio access (E-UTRA), ultra mobile broadband (UMB), IEEE 802.11 (Wi-Fi), IEEE 802.16 (WiMAX), IEEE 802.20, or Flash OFDMA may be implemented in the OFDMA system. UTRA and E-UTRA are respectively a Universal Mobile Telecommunications Service (UMTS) and an evolved version of the UMTS. A new version of the UMTS, namely, the E-UTRA, is used in 3GPP long term evolution (LTE) and various versions evolved based on LTE. In addition, the communication system is further applicable to future-oriented communication technologies such as the New Radio (NR) technology. If the communication system using a new communication technology includes a bearer setup, the communication system is applicable to the technical solutions provided in the embodiments of this application. The system architecture and service scenarios described in the embodiments of this application are intended for understanding the technical solutions in the embodiments of this application, and are not intended to limit the scope of the technical solutions provided in the embodiments of this application. As a network architecture evolves and new service scenarios emerge, the technical solutions provided in the embodiments of this application are also applicable to a similar technical problem.

(4) Time Domain Symbol: A time domain symbol may include but is not limited to an orthogonal frequency division multiplexing (OFDM) symbol.

(5) "A plurality of": indicates two or more, and other quantifiers are similar to this.

In addition, it should be understood that, in the descriptions of this application, terms such as "first" and "second" are only used for a purpose of distinguishing between objects, and are not to be understood as an indication or implication of relative importance, nor to be understood as an indication or implication of a sequence.

Figure 2:
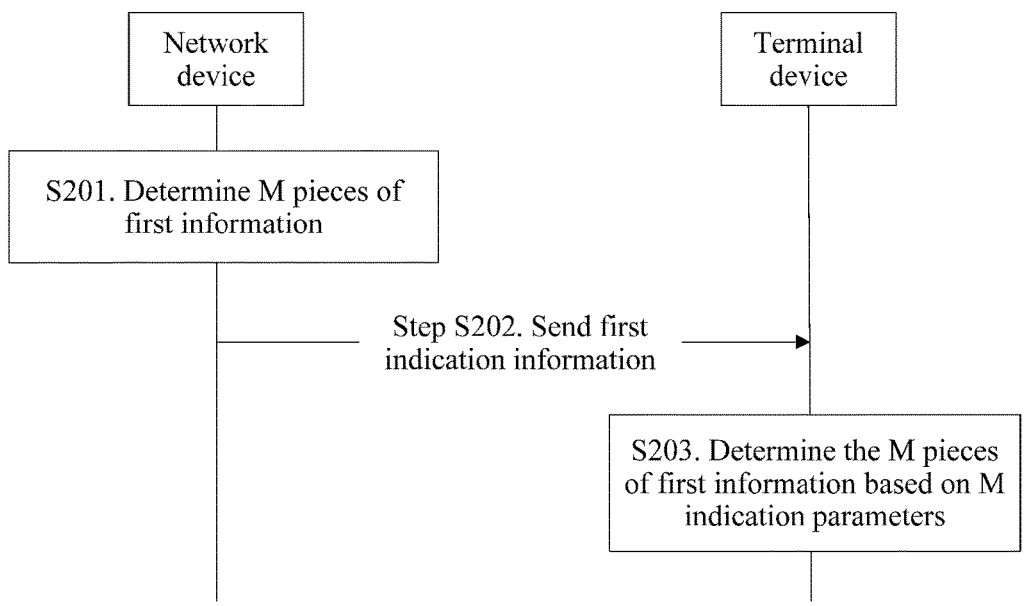
FIG. 2 is a schematic diagram of a communication method according to an embodiment of this application.

As shown in FIG. 2, an embodiment of this application provides a communication method. A network device in FIG. 2 may correspond to the network device 101 in FIG. 1, and a terminal device in FIG. 2 may correspond to the terminal device 102 in FIG. 1. The method includes the following steps.

Step S201: The network device determines M pieces of first information for the terminal device.

In this application, each piece of the first information includes a starting location S of time domain symbols occupied by uplink data or downlink data and a quantity L of the occupied time domain symbols. M, S, and L each are an integer. A value of M may be but is not limited to 16. When the value of M is 16, there are 16 pieces of the first information and each piece has an S value and an L value, or total 16 combinations of S and L values for the terminal device. When the value of M is 4, there are four pieces of the first information and each piece has an S value and an L value or total four combinations of S and L values for the terminal device.

Step S202: The network device sends first indication information to the terminal device. The first indication information is for the terminal device to obtain the first information.

The first indication information may be carried in higher layer signaling, such as RRC signaling or MAC signaling, and in this case, the first information may also be referred to as configuration information. Alternatively, the first information may be carried in dynamic signaling, such as a PDCCH.

In this application, the first indication information includes M indication parameters, and each indication parameter is represented by seven bits. The M indication parameters correspond to the M pieces of first information. Optionally, the M indication parameters are in a one-to-one correspondence with the M pieces of first information, or the M indication parameters respectively correspond to the M pieces of first information.

In an implementation, the M indication parameters may be determined based on the M pieces of first information.

In an example of this application, the M indication parameters may be M indication values, or may be M indexes. The M indication values may be specifically start and length indicator values (SLIV), or may be resource indication values (RIV). The M indexes may be indexes, and the index corresponds to a start and length index.

Step S203: The terminal device determines the M pieces of first information based on the M indication parameters.

In this embodiment of this application, the procedure shown in FIG. 2 is described in detail by using an example in which the M indication parameters in the foregoing procedure shown in FIG. 2 are M indication values.

First, the network device selects the M pieces of first information from a first-information set.

In this application, the first-information set may include all combinations of S and L. In a possible implementation, one slot may include 14 time domain symbols: a time domain symbol 0, a time domain symbol 1, a time domain symbol 2, . . . , a time domain symbol 13. A value of S may range from 0 to 13, and a value of L may range from 1 to 14. There are 105 combinations of S and L in total. A reference location of S may be a starting symbol of the PDCCH for scheduling data, or a slot boundary. For example, the value of S may be 0, and the value of L may be 2, which means that the uplink data or the downlink data occupies two time domain symbols in one slot from a starting location of the PDCCH for scheduling the uplink data or the downlink data, or may indicate that the uplink data or the downlink data occupies two time domain symbols in one slot from a time domain symbol 0 of the slot.

Second, the network device generates the M indication values based on the M pieces of first information.

For each of the M pieces of first information, if L in the first information meets that (L−1) is less than or equal to 7, the network device determines that an indication value corresponding to the first information is 14×(L−1)+S; or if L in the first information meets that (L−1) is greater than 7, the network device determines that the indication value corresponding to the first information is 14×(14−L+1)+(14−1−S). L is greater than 0 and less than or equal to (14−S), and S is greater than or equal to 0 and less than or equal to 13.

Third, the network device represents each of the M indication values by using seven bits, to obtain the first indication information.

In this embodiment of this application, the procedure shown in FIG. 2 is described in detail by using an example in which the M indication parameters in the foregoing procedure shown in FIG. 2 are M indication values and the M indication values are SLIVs.

First, the network device selects the M pieces of first information from a first-information set.

In an example of this application, a value of M may be 16, and when the value of M is 16, it indicates that the network device indicates 16 pieces of first information to the terminal device.

In this application, the first-information set may also include all combinations of S and L, for example, one slot includes 14 time domain symbols, and the first-information set may include 105 combinations of S and L.

Second, the network device jointly codes S and L in each of the M pieces of first information, to obtain an SLIV corresponding to each piece of first information.

In this application, for a formula for jointly coding S and L to obtain the SLIV corresponding to each piece of first information, refer to the following formula (1.1):

if $(L-1) \leq 7$, then $$SLIV = 14 \times (L-1) + S$$

else $$SLIV = 14 \times (14-L+1) + (14-1-S)$$

where $0 < L \leq 14-S$ and $0 \leq S \leq 13$      formula (1.1)

In an example of this application, when a value of S ranges from 0 to 13, and a value of L ranges from 1 to 14, a calculation manner of formula (1.1) is used. For a correspondence between (S, L) and an SLIV, refer to the following Table 2.

TABLE 2

| Length | Start | SLIV |
|---|---|---|
| 1 | 0 | 0 |
| 1 | 1 | 1 |
| 1 | 2 | 2 |
| 1 | 3 | 3 |
| 1 | 4 | 4 |
| 1 | 5 | 5 |
| 1 | 6 | 6 |
| 1 | 7 | 7 |
| 1 | 8 | 8 |
| 1 | 9 | 9 |
| 1 | 10 | 10 |
| 1 | 11 | 11 |
| 1 | 12 | 12 |
| 1 | 13 | 13 |
| 2 | 0 | 14 |
| 2 | 1 | 15 |
| 2 | 2 | 16 |
| 2 | 3 | 17 |
| 2 | 4 | 18 |
| 2 | 5 | 19 |
| 2 | 6 | 20 |
| 2 | 7 | 21 |
| 2 | 8 | 22 |
| 2 | 9 | 23 |

TABLE 2-continued

| Length | Start | SLIV |
|---|---|---|
| 2 | 10 | 24 |
| 2 | 11 | 25 |
| 2 | 12 | 26 |
| 3 | 0 | 28 |
| 3 | 1 | 29 |
| 3 | 2 | 30 |
| 3 | 3 | 31 |
| 3 | 4 | 32 |
| 3 | 5 | 33 |
| 3 | 6 | 34 |
| 3 | 7 | 35 |
| 3 | 8 | 36 |
| 3 | 9 | 37 |
| 3 | 10 | 38 |
| 3 | 11 | 39 |
| 4 | 0 | 42 |
| 4 | 1 | 43 |
| 4 | 2 | 44 |
| 4 | 3 | 45 |
| 4 | 4 | 46 |
| 4 | 5 | 47 |
| 4 | 6 | 48 |
| 4 | 7 | 49 |
| 4 | 8 | 50 |
| 4 | 9 | 51 |
| 4 | 10 | 52 |
| 5 | 0 | 56 |
| 5 | 1 | 57 |
| 5 | 2 | 58 |
| 5 | 3 | 59 |
| 5 | 3 | 59 |
| 5 | 4 | 60 |
| 5 | 5 | 61 |
| 5 | 6 | 62 |
| 5 | 7 | 63 |
| 5 | 8 | 64 |
| 5 | 9 | 65 |
| 6 | 0 | 70 |
| 6 | 1 | 71 |
| 6 | 2 | 72 |
| 6 | 3 | 73 |
| 6 | 4 | 74 |
| 6 | 5 | 75 |
| 6 | 6 | 76 |
| 6 | 7 | 77 |
| 6 | 8 | 78 |
| 7 | 0 | 84 |
| 7 | 1 | 85 |
| 7 | 2 | 86 |
| 7 | 3 | 87 |
| 7 | 4 | 88 |
| 7 | 5 | 89 |
| 7 | 6 | 90 |
| 7 | 7 | 91 |
| 8 | 0 | 98 |
| 8 | 1 | 99 |
| 8 | 2 | 100 |
| 8 | 3 | 101 |
| 8 | 4 | 102 |
| 8 | 5 | 103 |
| 8 | 6 | 104 |
| 9 | 0 | 97 |
| 9 | 1 | 96 |
| 9 | 2 | 95 |
| 9 | 3 | 94 |
| 9 | 4 | 93 |
| 9 | 5 | 92 |
| 10 | 0 | 83 |
| 10 | 1 | 82 |
| 10 | 2 | 81 |
| 10 | 3 | 80 |
| 10 | 4 | 79 |
| 11 | 0 | 69 |
| 11 | 1 | 68 |
| 11 | 2 | 67 |
| 11 | 3 | 66 |
| 12 | 0 | 55 |
| 12 | 1 | 54 |

TABLE 2-continued

| Length | Start | SLIV |
|---|---|---|
| 12 | 2 | 53 |
| 13 | 0 | 41 |
| 13 | 1 | 40 |
| 14 | 0 | 27 |

Third, the SLIV corresponding to each piece of first information is represented by seven bits.

In this embodiment of this application, for example, 000 000 0 is used to represent SLIV=0 in Table 2, and 000 001 0 is used to represent SLIV=2 in Table 2.

It may be learned from the foregoing description that if the value of S ranges from 0 to 13, and the value of L ranges from 1 to 14, there are 105 combinations of S and L in total, and seven bits may represent $2^7=128$ pieces of binary data in total. For data from 105 to 127, the network device may use the following two processing manners. In a first processing manner, according to a predefined rule, the network device does not configure the data from 105 to 127 for the terminal device. In a second processing manner, the network device may configure the data from 105 to 127 for the terminal device, and the data from 105 to 127 is used to indicate a default value according to a protocol specification, for example, S of uplink data or downlink data corresponding to the default value is 0, and L of the uplink data or the downlink data corresponding to the default value is 14.

In this embodiment of this application, the correspondence between (S, L) and an SLIV may be obtained based on formula (1.1), and the network device may indicate the SLIV by using seven bits. In this way, the network device can flexibly configure all the combinations of S and L for the terminal device. In addition, consecutive SLIVs may also be obtained by using formula (1.1). Compared with a prior-art problem that SLIVs are nonconsecutive, in this embodiment, consistent information can be ensured for the network device and the terminal device, and data transmission reliability is ensured.

In another example in this application, the process in this application is described in detail by using an example in which the M indication parameters in the foregoing procedure shown in FIG. 2 are M indexes.

First, the network device selects the M pieces of first information from a first-information set.

Second, the network device generates M indication values based on the M pieces of first information.

For each of the M pieces of first information, the M indication values may be generated in any one of the following two manners.

In a first manner, if L in the first information meets that (L−1) is less than or equal to 7, the network device determines that an indication value corresponding to the first information is 14×(L−1)+S; or if L in the first information meets that (L−1) is greater than 7, the network device determines that the indication value corresponding to the first information is 14×(14−L+1)+(14−1−S).

In a second manner, if L in the first information meets that (L−1) is less than 7, the network device determines that an indication value corresponding to the first information is 14×(L−1)+S; or if L in the first information meets that (L−1) is greater than or equal to 7, the network device determines that the indication value corresponding to the first information is 14×(14−L+1)+(14−1−S).

In the first manner and the second manner, L is greater than 0 and less than or equal to (14−S), and S is greater than or equal to 0 and less than or equal to 13.

Third, the network device determines the M indexes based on the M indication values.

In an example of this application, the network device may pre-determine a correspondence between an indication value and an index. The correspondence may be protocol-specific. The network device may determine, based on the correspondence, the M indexes corresponding to the M indication values. The protocol-specific correspondence between an indication value and an index is subsequently described in detail.

In this application, the M indexes are in a subset of X indexes, and the M indication values are in a subset of X indication values. The X indexes correspond to the X indication values. Optionally, the X indexes are in a one-to-one correspondence with the X indication values, or the X indexes respectively correspond to the X indication values. Values of the X indexes are different from a value corresponding to the one index, and X is a positive integer.

Fourth, the network device represents each of the M indexes by using seven bits, to obtain the first indication information.

In another example in this application, the process in this application is described in detail by using an example in which the M indication parameters in the foregoing procedure shown in FIG. 2 are M indexes, there is a correspondence between the M indication parameters and M SLIVs, and there is a correspondence between the M SLIVs and the M indexes.

First, the network device determines an SLIV value corresponding to each piece of first information in a first-information set.

In an example of this application, the network device may obtain, based on formula (1.1), the SLIV corresponding to each piece of first information.

In an example of this application, the network device may obtain, based on formula (1.2), the SLIV corresponding to each piece of first information, and a process is as follows:

The network device jointly codes (S, L) in each piece of first information by using formula (1.2), to obtain the SLIV corresponding to each piece of first information.

if $(L-1)<7$, then $SLIV=14\times(L-1)+S$ else $SLIV=14\times(14-L+1)+(14-1-S)$ where $0<L\leq14-S$ and $0\leq S\leq13$  formula (1.2)

Second, the network device may establish a correspondence between an SLIV value and an index according to one of the following rules.

1. Sort SLIVs in ascending order (or in descending order) of L:
  for same L, sort SLIVs in ascending order of S;
  for same L, sort SLIVs in descending order of S;
  for same L, sort SLIVs in ascending order of SLIVs; or
  for same L, sort SLIVs in descending order of SLIVs.
  For the sorted SLIVs, an index is sequentially added to each SLIV value in a front-to-back order In an example of this application, when the SLIVs are sorted in ascending order of L, and for same L, the SLIVs are sorted in ascending order of S, and adjacent SLIVs are progressively increased by 1 from an index 0, the generated correspondence between an SLIV and an index and a correspondence between first information and an SLIV value may be shown in Table 3.

TABLE 3

| Index | Length | Start | SLIV |
|---|---|---|---|
| 0 | 1 | 0 | 0 |
| 1 | 1 | 1 | 1 |
| 2 | 1 | 2 | 2 |
| 3 | 1 | 3 | 3 |
| 4 | 1 | 4 | 4 |
| 5 | 1 | 5 | 5 |
| 6 | 1 | 6 | 6 |
| 7 | 1 | 7 | 7 |
| 8 | 1 | 8 | 8 |
| 9 | 1 | 9 | 9 |
| 10 | 1 | 10 | 10 |
| 11 | 1 | 11 | 11 |
| 12 | 1 | 12 | 12 |
| 13 | 1 | 13 | 13 |
| 14 | 2 | 0 | 14 |
| 15 | 2 | 1 | 15 |
| 16 | 2 | 2 | 16 |
| 17 | 2 | 3 | 17 |
| 18 | 2 | 4 | 18 |
| 19 | 2 | 5 | 19 |
| 20 | 2 | 6 | 20 |
| 21 | 2 | 7 | 21 |
| 22 | 2 | 8 | 22 |
| 23 | 2 | 9 | 23 |
| 24 | 2 | 10 | 24 |
| 25 | 2 | 11 | 25 |
| 26 | 2 | 12 | 26 |
| 27 | 3 | 0 | 28 |
| 28 | 3 | 1 | 29 |
| 29 | 3 | 2 | 30 |
| 30 | 3 | 3 | 31 |
| 31 | 3 | 4 | 32 |
| 32 | 3 | 5 | 33 |
| 33 | 3 | 6 | 34 |
| 34 | 3 | 7 | 35 |
| 35 | 3 | 8 | 36 |
| 36 | 3 | 9 | 37 |
| 37 | 3 | 10 | 38 |
| 38 | 3 | 11 | 39 |
| 39 | 4 | 0 | 42 |
| 40 | 4 | 1 | 43 |
| 41 | 4 | 2 | 44 |
| 42 | 4 | 3 | 45 |
| 43 | 4 | 4 | 46 |
| 44 | 4 | 5 | 47 |
| 45 | 4 | 6 | 48 |
| 46 | 4 | 7 | 49 |
| 47 | 4 | 8 | 50 |
| 48 | 4 | 9 | 51 |
| 49 | 4 | 10 | 52 |
| 50 | 5 | 0 | 56 |
| 51 | 5 | 1 | 57 |
| 52 | 5 | 2 | 58 |
| 53 | 5 | 3 | 59 |
| 54 | 5 | 4 | 60 |
| 55 | 5 | 5 | 61 |
| 56 | 5 | 6 | 62 |
| 57 | 5 | 7 | 63 |
| 58 | 5 | 8 | 64 |
| 59 | 5 | 9 | 65 |
| 60 | 6 | 0 | 70 |
| 61 | 6 | 1 | 71 |
| 62 | 6 | 2 | 72 |
| 63 | 6 | 3 | 73 |
| 64 | 6 | 4 | 74 |
| 65 | 6 | 5 | 75 |
| 66 | 6 | 6 | 76 |
| 67 | 6 | 7 | 77 |
| 68 | 6 | 8 | 78 |
| 69 | 7 | 0 | 84 |
| 70 | 7 | 1 | 85 |
| 71 | 7 | 2 | 86 |
| 72 | 7 | 3 | 87 |
| 73 | 7 | 4 | 88 |
| 74 | 7 | 5 | 89 |
| 75 | 7 | 6 | 90 |
| 76 | 7 | 7 | 91 |
| 77 | 8 | 0 | 98 |
| 78 | 8 | 1 | 99 |
| 79 | 8 | 2 | 100 |
| 80 | 8 | 3 | 101 |
| 81 | 8 | 4 | 102 |
| 82 | 8 | 5 | 103 |
| 83 | 8 | 6 | 104 |
| 84 | 9 | 0 | 97 |
| 85 | 9 | 1 | 96 |
| 86 | 9 | 2 | 95 |
| 87 | 9 | 3 | 94 |
| 88 | 9 | 4 | 93 |
| 89 | 9 | 5 | 92 |
| 90 | 10 | 0 | 83 |
| 91 | 10 | 1 | 82 |
| 92 | 10 | 2 | 81 |
| 93 | 10 | 3 | 80 |
| 94 | 10 | 4 | 79 |
| 95 | 11 | 0 | 69 |
| 96 | 11 | 1 | 68 |
| 97 | 11 | 2 | 67 |
| 98 | 11 | 3 | 66 |
| 99 | 12 | 0 | 55 |
| 100 | 12 | 1 | 54 |
| 101 | 12 | 2 | 53 |
| 102 | 13 | 0 | 41 |
| 103 | 13 | 1 | 40 |
| 104 | 14 | 0 | 27 |

2. Sort SLIVs in ascending order (or in descending order) of S:

for same S, sort SLIVs in ascending order of L;
for same S, sort SLIVs in descending order of L;
for same S, sort SLIVs in ascending order of SLIVs; or
for same S, sort SLIVs in descending order of SLIVs.

For the sorted SLIVs, an index is sequentially added to each SLIV value in a front-to-back order.

Third, the network device selects the M pieces of first information from the first-information set.

Fourth, the network device determines, based on a correspondence between first information and an SLIV in the foregoing correspondences, the SLIV corresponding to each of the M pieces of first information.

Fifth, the network device determines, based on the correspondence between an SLIV and an index in the foregoing correspondences, an index corresponding to each of the M SLIVs.

Sixth, the network device uses seven bits to represent each of the M indexes.

In this embodiment of this application, compared with calculating the correspondence between (S, L) and an SLIV by using formula (1.2), when the correspondence between (S, L) and an SLIV is calculated by using formula (1.1), consecutive SLIVs can be ensured. In addition, when there are 105 pieces of first information in total, regardless of whether formula (1.1) or formula (1.2) is used, each piece of first information may be represented by using seven bits, and the network device may indicate all combinations of (S, L), thereby implementing flexible data scheduling. A correspondence between seven bits and an SLIV is also agreed on, thereby ensuring consistent information for a base station and a user, and ensuring reliable data transmission.

Figure 3:
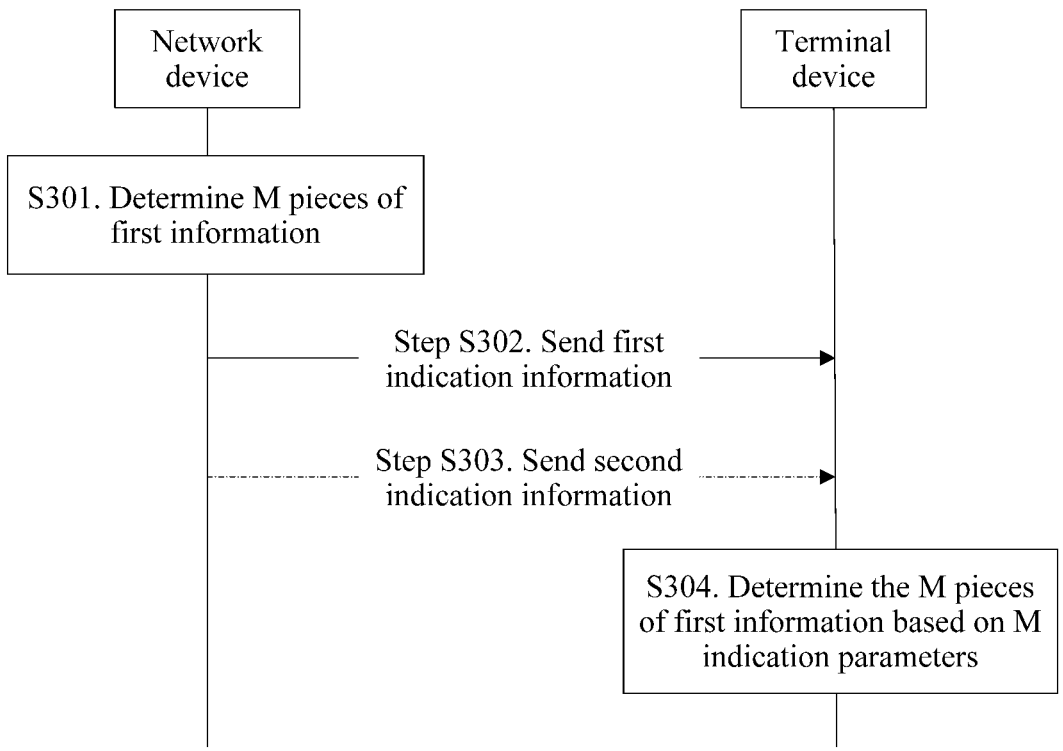
FIG. 3 is a schematic diagram of a communication method according to another embodiment of this application.

As shown in FIG. 3, this application provides a procedure of a communication method. A network device in the procedure may correspond to the network device 101 in FIG. 1, and a terminal device may correspond to the terminal device 102 in the foregoing procedure. The method includes the following steps.

Step S301: The network device determines M pieces of first information.

In this embodiment of this application, the network device first determines N pieces of first information, where N is an integer less than or equal to 64; and then selects the M pieces of first information from the N pieces of first information, where the N pieces of first information are in a subset of a first-information set, the M pieces of first information are in a subset of the N pieces of first information, each piece of first information includes starting location information S of time domain symbols occupied by uplink data or downlink data and quantity information L of the occupied time domain symbols, and the first information may also be referred to as configuration information, a combination of S and L, or the like.

In this embodiment of this application, the network device may determine the N pieces of first information in a plurality of implementations. In a first implementation, the network device may select the N pieces of first information from the first-information set according to a protocol specification. For example, if only first information with L being 1, 2, 4, 7, and 14 is supported according to the protocol specification, the network device may select the first information with L being 1, 2, 4, 7, and 14 from the first-information set, to form the N pieces of first information. For another example, if only first information with L being 2, 4, 7, and 14 is supported according to the protocol specification, the network device may select the first information with L being 2, 4, 7, and 14 from the first-information set, to form the N pieces of first information. In a second implementation, the N pieces of first information may be directly protocol-specified. For example, a table of the N pieces of first information is directly provided, where values of L in the N pieces of first information may include 1, 2, 4, 7, and 14, and for another example, values of L in the N pieces of first information may include 2, 4, 7, and 14. The network device determines the N pieces of first information according to a protocol specification. In a third implementation, the network device selects the N pieces of first information from the first-information set, to determine the N pieces of first information.

In this embodiment of this application, when the implementation for determining the N pieces of first information by the network device is the first or the second implementation, the values of L in the N pieces of first information finally determined by the network device may include one or more values in 1 to 14, and the one or more values include at least one of 1, 2, 4, 7, and 14. For example, the values of L in the N pieces of first information selected by the network device may include 1, 2, 4, 6, 7, and the like. An implementation falls within the protection scope of this application provided that the values of L in the N pieces of first information include at least one of 1, 2, 4, 7, and 14 and N is less than or equal to 64. When the implementation for determining the N pieces of first information by the network device is the third implementation, the values of L in the N pieces of first information are not limited, and fall within the protection scope of this application provided that N is less than or equal to 64.

Step S302: The network device sends first indication information.

The first indication information may be carried in higher layer signaling, such as RRC signaling or MAC signaling, and in this case, the first information may also be referred to as configuration information. Alternatively, the first indication information may be carried in dynamic signaling, such as a PDCCH.

In this application, the first indication information includes M indication parameters, each indication parameter is represented by six bits, and the M indication parameters correspond to the M pieces of first information. Optionally, the M indication parameters are in a one-to-one correspondence with the M pieces of first information, or the M indication parameters respectively correspond to the M pieces of first information.

In an implementation, the M indication parameters are determined based on the M pieces of first information.

In an example of this application, the M indication parameters may be M indication values, or may be M indexes. The M indication values may be specifically SLIV, or may be RIV. The M indexes may be indexes, and the index corresponds to a start and length index.

Optionally, after or before step S302, when the implementation for determining the N pieces of first information by the network device is the third implementation, the method may further include: Step S303: The network device sends second indication information, where the second indication information may be RRC signaling, and the second indication information is used to indicate the values of L included in the N pieces of first information. The second indication information may be represented by Y bits, each of the Y bits is used to indicate whether there is a corresponding value of L in the first information, and Y is a positive integer. For example, when one slot includes 14 OFDM symbols, the second indication information may be represented by a bitmap of 14 bits, a value of the first bit in the 14 bits is used to indicate whether the N pieces of first information include Y=1, a value of the second bit in the 14 bits is used to indicate whether the N pieces of first information include Y=2, and so on. If a bit is 1, it indicates that there is corresponding L in the N pieces of first information, and if a bit is 0, it indicates that there is no corresponding L in the N pieces of first information. For example, the bitmap of 14 bits may be 000 000 000 000 11, and it indicates that L supported in the protocol is 1 and 2, or the N pieces of first information include L=1 and L=2. Alternatively, if a bit is 0, it indicates that there is corresponding L in the N pieces of first information, and if a bit is 1, it indicates that there is no corresponding L in the N pieces of first information. For example, the bitmap of 14 bits may be 000 000 000 000 11, and it indicates that the N pieces of first information do not include L=1 or L=2, but include L=3 to 14.

Step S304: The terminal device determines the M pieces of first information based on the M indication parameters.

In this embodiment of this application, the procedure shown in FIG. 3 is described in detail by using an example in which the M indication parameters in the foregoing procedure shown in FIG. 3 are M indication values.

First, the network device determines the N pieces of first information.

For how to determine the N pieces of first information, refer to the foregoing descriptions of the procedure shown in FIG. 3. Details are not described herein again.

Second, the network device selects the M pieces of first information from the N pieces of first information.

Third, the network device generates the M indication values based on the M pieces of first information.

For each of the M pieces of first information, if L in the first information meets that (L−1) is less than or equal to 7, the network device determines that an indication value corresponding to the first information is 14×(L−1)+S; or if L in the first information meets that (L−1) is greater than 7, the network device determines that the indication value corresponding to the first information is 14×(14−L+1)+(14−

1−S). L is greater than 0 and less than or equal to (14−S), and S is greater than or equal to 0 and less than or equal to 13.

Fourth, the network device use six bits to represent each of the M indication values, to obtain the first indication information.

It should be noted that, because the network device selects the M pieces of first information from the N pieces of first information, and each indication value is directly represented by six bits, a value of an indication value may be greater than 64, and in this case, the indication value cannot be directly represented by six bits. When the network device is an intelligent network device, and indication values of the N pieces of first information are definitely within 64, this solution may be used.

In this embodiment of this application, the process in this application is described in detail by using an example in which the M indication parameters in the foregoing procedure shown in FIG. 3 are M indexes, there is a correspondence between the M indication parameters and M SLIVs, and there is a correspondence between the M SLIVs and the M indexes.

First, the network device determines the N pieces of first information.

For how to determine the N pieces of first information, refer to the foregoing descriptions of the procedure shown in FIG. 3. Details are not described herein again.

Second, the network device selects the M pieces of first information from the N pieces of first information.

For example, when a value of M is 16, it indicates that the network device selects 16 pieces of first information from the N pieces of first information.

Third, the network device generates the M indication values based on the M pieces of first information.

For each of the M pieces of first information, the M indication values may be generated in any one of the following two manners.

In a first manner, if L in the first information meets that (L−1) is less than or equal to 7, the network device determines that an indication value corresponding to the first information is 14×(L−1)+S; or if L in the first information meets that (L−1) is greater than 7, the network device determines that the indication value corresponding to the first information is 14×(14−L+1)+(14−1−S).

In a second manner, if L in the first information meets that (L−1) is less than 7, the network device determines that an indication value corresponding to the first information is 14×(L−1)+S; or if L in the first information meets that (L−1) is greater than or equal to 7, the network device determines that the indication value corresponding to the first information is 14×(14−L+1)+(14−1−S).

In the first manner and the second manner, L is greater than 0 and less than or equal to (14−S), and S is greater than or equal to 0 and less than or equal to 13.

Fourth, the network device determines the M indexes based on the M indication values.

In an example of this application, the network device may pre-determine a correspondence between an indication value and an index. The correspondence may be protocol-specified. The network device may determine, based on the correspondence, the M indexes corresponding to the M indication values. The protocol-specified correspondence between an indication value and an index is subsequently described in detail.

In this application, the M indexes are in a subset of X indexes, and the M indication values are in a subset of X indication values. The X indexes are in a one-to-one correspondence with the X indication values. Values of the X index are different from a value corresponding to the one index, and X is a positive integer.

Fifth, the network device represents each of the M indexes by using six bits, to obtain the first indication information.

In another example in this application, the process in this application is described in detail by using an example in which the M indication parameters in the foregoing procedure shown in FIG. 3 are M indexes, there is a correspondence between the M indication parameters and M SLIVs, and there is a correspondence between the M SLIVs and the M indexes.

First, the network device selects the N pieces of first information from the first-information set.

For how to determine the N pieces of first information, refer to the foregoing descriptions of the procedure shown in FIG. 3. Details are not described herein again.

Second, the network device determines an SLIV corresponding to each of the N pieces of first information.

In an example of this application, the network device may obtain, based on formula (1.1) or formula (1.2), the SLIV corresponding to each of the N pieces of first information.

Third, the network device may establish a correspondence between an SLIV and an index according to one of the following rules.

1. Sort SLIVs in ascending order (or in descending order) of L:
for same L, sort SLIVs in ascending order of S;
for same L, sort SLIVs in descending order of S;
for same L, sort SLIVs in ascending order of SLIVs; or
for same L, sort SLIVs in descending order of SLIVs.

For the sorted SLIVs, an index is sequentially added to each SLIV in a front-to-back order.

In an example of this application, when first information with L=1, 2, 4, 7, and 14 is protocol-specified, the SLIVs are sorted in ascending order of L, and for same L, the SLIVs are sorted in ascending order of S, and adjacent SLIVs are progressively increased by 1 from an index 0, the generated correspondence between an SLIV and an index may be shown in the following Table 4.

TABLE 4

| Index | Length | Start | SLIV |
|---|---|---|---|
| 0 | 1 | 0 | 0 |
| 1 | 1 | 1 | 1 |
| 2 | 1 | 2 | 2 |
| 3 | 1 | 3 | 3 |
| 4 | 1 | 4 | 4 |
| 5 | 1 | 5 | 5 |
| 6 | 1 | 6 | 6 |
| 7 | 1 | 7 | 7 |
| 8 | 1 | 8 | 8 |
| 9 | 1 | 9 | 9 |
| 10 | 1 | 10 | 10 |
| 11 | 1 | 11 | 11 |
| 12 | 1 | 12 | 12 |
| 13 | 1 | 13 | 13 |
| 14 | 2 | 0 | 14 |
| 15 | 2 | 1 | 15 |
| 16 | 2 | 2 | 16 |
| 17 | 2 | 3 | 17 |
| 18 | 2 | 4 | 18 |
| 19 | 2 | 5 | 19 |
| 20 | 2 | 6 | 20 |
| 21 | 2 | 7 | 21 |
| 22 | 2 | 8 | 22 |
| 23 | 2 | 9 | 23 |
| 24 | 2 | 10 | 24 |
| 25 | 2 | 11 | 25 |
| 26 | 2 | 12 | 26 |
| 27 | 4 | 0 | 42 |

TABLE 4-continued

| Index | Length | Start | SLIV |
|---|---|---|---|
| 28 | 4 | 1 | 43 |
| 29 | 4 | 2 | 44 |
| 30 | 4 | 3 | 45 |
| 31 | 4 | 4 | 46 |
| 32 | 4 | 5 | 47 |
| 33 | 4 | 6 | 48 |
| 34 | 4 | 7 | 49 |
| 35 | 4 | 8 | 50 |
| 36 | 4 | 9 | 51 |
| 37 | 4 | 10 | 52 |
| 38 | 7 | 0 | 84 |
| 39 | 7 | 1 | 85 |
| 40 | 7 | 2 | 86 |
| 41 | 7 | 3 | 87 |
| 42 | 7 | 4 | 88 |
| 43 | 7 | 5 | 89 |
| 44 | 7 | 6 | 90 |
| 45 | 7 | 7 | 91 |
| 46 | 14 | 0 | 27 |

Fourth, the network device selects the M pieces of first information from the N pieces of first information.

In this embodiment of this application, a value of M may be 16, and when the value of M is 16, it indicates that the network device configures 16 pieces of first information for the terminal device.

Fifth, the network device determines, based on a correspondence between first information and an SLIV in the foregoing correspondences, the SLIV corresponding to each of the M pieces of first information.

Sixth, the network device determines, based on the correspondence between an SLIV and an index in the foregoing correspondences, an index corresponding to each of the M SLIVs.

Seventh, the network device uses six bits to represent each of the M indexes.

In this embodiment of this application, values of the six bits are in a one-to-one correspondence with indexes. For example, 000 000 is used to correspond to an index 0, and 000 010 is used to correspond to an index 2.

Eighth, when a manner of determining the N pieces of first information by the network device is the third implementation, the network device represents, by using a bitmap of Y bits, L supported in the protocol, or represents a length L in the N pieces of first information by using a bitmap of Y bits.

In an example of this application, when one slot includes 14 time domain symbols, the network device may represent, by using a bitmap of 14 bits, L supported in the protocol. For example, if L supported according to a protocol specification is 2, 7, and 14, the bitmap of 14 bits may be 00 100 001 000 010, or may be 11 011 110 111 101.

For example, in an example of this application, when L supported according to a protocol specification is 2, 7, and 14, for a corresponding index, a corresponding SLIV, and a correspondence between an SLIV and first information, refer to the following Table 5.

TABLE 5

| Index | Length | Start | SLIV |
|---|---|---|---|
| 0 | 2 | 0 | 14 |
| 1 | 2 | 1 | 15 |
| 2 | 2 | 2 | 16 |
| 3 | 2 | 3 | 17 |
| 4 | 2 | 4 | 18 |

TABLE 5-continued

| Index | Length | Start | SLIV |
|---|---|---|---|
| 5 | 2 | 5 | 19 |
| 6 | 2 | 6 | 20 |
| 7 | 2 | 7 | 21 |
| 8 | 2 | 8 | 22 |
| 9 | 2 | 9 | 23 |
| 10 | 2 | 10 | 24 |
| 11 | 2 | 11 | 25 |
| 12 | 2 | 12 | 26 |
| 13 | 7 | 0 | 84 |
| 14 | 7 | 1 | 85 |
| 15 | 7 | 2 | 86 |
| 16 | 7 | 3 | 87 |
| 17 | 7 | 4 | 88 |
| 18 | 7 | 5 | 89 |
| 19 | 7 | 6 | 90 |
| 20 | 7 | 7 | 91 |
| 21 | 14 | 0 | 27 |

It may be learned from the foregoing descriptions that in this embodiment of this application, the network device and the terminal device may obtain a correspondence between (S, L) and an SLIV based on formula (1.1) or formula (1.2), and the network device may indicate an SLIV value of a selected data length by using six bits. In this way, a quantity of bits in a signaling configuration can be reduced, and a protocol-specified combination (S, L) can be indicated, to implement flexible data scheduling, ensure consistent information for the network device and the terminal device, and ensure a data transmission possibility.

It should be noted that in this embodiment of this application, the bitmap may be used to represent L supported according to the protocol specification, and the bitmap may also be used to represent S supported according to the protocol specification. For example, if only time domain symbols of S=0 to 7 are supported according to the protocol specification, the bitmap of 14 bits may be 00 000 011 111 111, or may be 11 111 100 000 000.

It may be learned from the foregoing Table 3 that, there are only a maximum of 47 pieces of first information (specifically, 0 to 46) in which L is 1, 2, 4, 7, and 14 according to the protocol specification, but 6-bit binary data can represent a maximum of $2^6=64$ pieces of data. Therefore, for data from 47 to 63, the following two processing manners may be used: A first manner specifies that the network device does not configure the data from 47 to 63 for the terminal device; and a second manner specifies that when the network device configures the data from 47 to 63 for the terminal device, the data from 47 to 63 is a default value, for example, the default value may correspond to a starting location S=0 and L=14 that are protocol-specified.

This application provides a communication method. A network device in the method may correspond to the network device 101 in FIG. 1, and the method includes the following steps.

The network device determines M pieces of first information, where $M_i$ pieces of first information in the M pieces of first information are in a subset of an $i^{th}$ first-information set, the $i^{th}$ first-information set is an $i^{th}$ first-information set in P first-information sets, a quantity of pieces of first information included in each of the P first-information sets is less than or equal to 64, the first information includes starting location information S of time domain symbols occupied by uplink data or downlink data and quantity information L of the occupied time domain symbols, S, L, M, i, and P each are an integer, i≤P, and $\Sigma_{i=1}^{P} M_i = M$.

The network device sends first indication information, where the first indication information includes M indication parameters, each indication parameter is represented by six bits, and $M_i$ indication parameters in the M indication parameters are in a one-to-one correspondence with the $M_i$ pieces of first information in the M pieces of first information.

In an example of this application, values of L corresponding to first information included in at least one of the P first-information sets include one or more values in 1 to 14, and the one or more values include at least one of 1, 2, 4, 7, and 14.

In an example of this application, the M indication parameters are M indication values; and that $M_i$ indication parameters in the M indication parameters are in a one-to-one correspondence with the $M_i$ pieces of first information in the M pieces of first information includes: if (L−1) is less than or equal to 7, an indication value corresponding to the first information is 14×(L−1)+S; or if (L−1) is greater than 7, the indication value corresponding to the first information is 14×(14−L+1)+(14−1−S), where L is greater than 0 and less than or equal to (14−S), and S is greater than or equal to 0 and less than or equal to 13.

In an example of this application, the M indication parameters are M indexes; and that $M_i$ indication parameters in the M indication parameters are in a one-to-one correspondence with the $M_i$ pieces of first information in the M pieces of first information includes: the $M_i$ pieces of first information in the M pieces of first information are in a one-to-one correspondence with $M_i$ indication values in M indication values, $M_i$ indexes in the M indexes are in a one-to-one correspondence with the $M_i$ indication values in the M indication values, the $M_i$ indexes are in a subset of X indexes, the $M_i$ indication values are in a subset of X indication values, the X indexes are in a one-to-one correspondence with the X indication values, at least one index of the X indexes is respectively different from at least one indication value corresponding to the at least one index, and X is a positive integer.

In an example of this application, that the $M_i$ pieces of first information in the M pieces of first information are in a one-to-one correspondence with $M_i$ indication values in M indication values includes: if (L−1) is less than or equal to 7, an indication value corresponding to the first information is 14×(L−1)+S, or if (L−1) is greater than 7, the indication value corresponding to the first information is 14×(14−L+1)+(14−1−S); or if (L−1) is less than 7, an indication value corresponding to the first information is 14×(L−1)+S, or if (L−1) is greater than or equal to 7, the indication value corresponding to the first information is 14×(14−L+1)+(14−1−S), where L is greater than 0 and less than or equal to (14−S), and S is greater than or equal to 0 and less than or equal to 13. In an example of this application, P is predefined, and P=2.

This application provides a communication method. A terminal device in the method may correspond to the terminal device 102 in the foregoing procedure, and the method includes the following steps.

The terminal device receives first indication information, where the first indication information includes M indication parameters, and each indication parameter is represented by six bits.

The terminal device determines M pieces of first information, where $M_i$ pieces of first information in the M pieces of first information are in a one-to-one correspondence with $M_i$ indication parameters in the M indication parameters, the $M_i$ pieces of first information in the M pieces of first information are in a subset of an $i^{th}$ first-information set, the i first-information set is an i first-information set in P first-information sets, a quantity of pieces of first information included in each of the P first-information sets is less than or equal to 64, the first information includes starting location information S of time domain symbols occupied by uplink data or downlink data and quantity information L of the occupied time domain symbols, S, L, M, i, and P each are an integer, i≤P, and $\Sigma_{i=1}^{P} M_i = M$.

In an example of this application, values of L corresponding to first information included in at least one of the P first-information sets include one or more values in 1 to 14, and the one or more values include at least one of 1, 2, 4, 7, and 14.

In an example of this application, the M indication parameters are M indication values; and that $M_i$ pieces of first information in the M pieces of first information are in a one-to-one correspondence with $M_i$ indication parameters in the M indication parameters includes:

if (L−1) is less than or equal to 7, an indication value corresponding to the first information is 14×(L−1)+S; or if (L−1) is greater than 7, the indication value corresponding to the first information is 14×(14−L+1)+(14−1−S), where L is greater than 0 and less than or equal to (14−S), and S is greater than or equal to 0 and less than or equal to 13.

In an example of this application, the M indication parameters are M indexes; and that $M_i$ pieces of first information in the M pieces of first information are in a one-to-one correspondence with $M_i$ indication parameters in the M indication parameters includes:

the $M_i$ pieces of first information in the M pieces of first information are in a one-to-one correspondence with $M_i$ indication values in M indication values; and $M_i$ indexes the M indexes are in a one-to-one correspondence with the $M_i$ indication values the M indication values, the $M_i$ indexes are in a subset of X indexes, the $M_i$ indication values are in a subset of X indication values, the X indexes are in a one-to-one correspondence with the X indication values, at least one index of the X indexes is respectively different from at least one indication value corresponding to the at least one index, and X is a positive integer.

In an example of this application, that the $M_i$ pieces of first information in the M pieces of first information are in a one-to-one correspondence with $M_i$ indication values in M indication values includes:

if (L−1) is less than or equal to 7, an indication value corresponding to the first information is 14×(L−1)+S; or if (L−1) is greater than 7, the indication value corresponding to the first information is 14×(14−L+1)+(14−1−S); or if (L−1) is less than 7, an indication value corresponding to the first information is 14×(L−1)+S; or if (L−1) is greater than or equal to 7, the indication value corresponding to the first information is 14×(14−L+1)+(14−1−S); where L is greater than 0 and less than or equal to (14−S), and S is greater than or equal to 0 and less than or equal to 13.

In an example of this application, P is predefined, and P=2.

Figure 5:
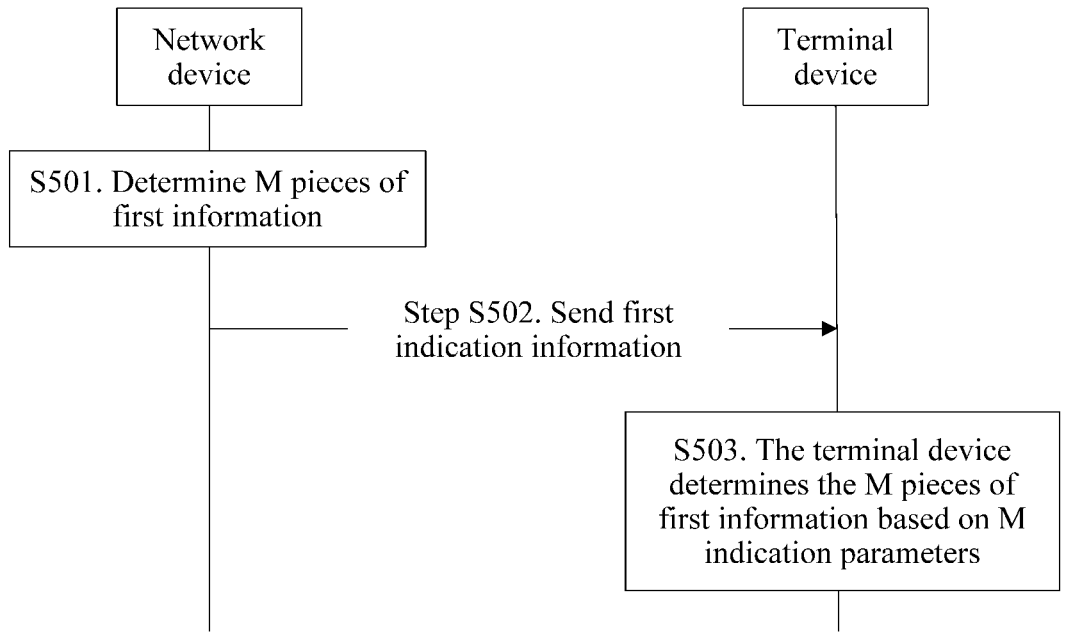
FIG. 5 is a schematic diagram of a communication method according to still another embodiment of this application.

As shown in FIG. 5, this application provides a procedure of a communication method. A network device in the procedure may correspond to the network device 101 in FIG. 1, and a terminal device may correspond to the terminal device 102 in the foregoing procedure. The method includes the following steps.

Step S501: The network device determines M pieces of first information.

In this embodiment of this application, the network device first determines P first-information sets, where a quantity of pieces of first information in each of the P first-information sets is less than or equal to 64; and then selects $M_i$ pieces of first information from an $i^{th}$ first information set in the P first-information sets, where the $M_i$ pieces of first information are in a subset of the $i^{th}$ first-information set, and each piece of first information includes starting location information S of time domain symbols occupied by uplink data or downlink data and quantity information L of the occupied time domain symbols, or the first information is a combination of S and L, or the like.

In this embodiment of this application, in an implementation, the P first-information sets may be protocol-specified, and each first-information set includes a maximum of 64 pieces of first information. For example, P=2 first-information sets are protocol-specified, and every two first-information sets are not completely the same.

In this embodiment of this application, values of L in first information in each first-information set are not limited, and fall within the protection scope of this application provided that N is less than or equal to 64. In an implementation, values of L in at least one of the P first-information sets may include 1, 2, 4, 7, and 14, and for another example, values of L in N pieces of first information may include 2, 4, 7, and 14.

Step S502: The network device sends first indication information.

The first indication information may be carried in higher layer signaling, such as RRC signaling or MAC signaling, and in this case, the first information may also be referred to as configuration information. Alternatively, the first indication information may be carried in dynamic signaling, such as a PDCCH.

In this application, the first indication information includes M indication parameters, each indication parameter is represented by six bits, and $M_i$ indication parameters in the M indication parameters are in a one-to-one correspondence with $M_i$ pieces of first information in the M pieces of first information.

In an implementation, the M indication parameters are determined based on the M pieces of first information.

In an example of this application, the M indication parameters may be M indication values, or may be M indexes. The M indication values may be specifically SLIV, or may be RIV. The M indexes may be indexes, and the index corresponds to a start and length index.

Step S503: The terminal device determines the M pieces of first information based on the M indication parameters.

In this embodiment of this application, the procedure shown in FIG. 5 is described in detail by using an example in which the M indication parameters in the foregoing procedure shown in FIG. 5 are M indication values.

First, the network device determines the P first-information sets.

The P first-information sets may be protocol-specified first-information sets, and details are not described herein. For example, P=2 first-information sets may be protocol-specified.

Second, the network device selects the M pieces of first information.

The network device selects the $M_i$ pieces of first information from the $i^t$ information set in the P first-information sets, thereby selecting the M pieces of first information in total. For example, the network device selects $M_1$ pieces of first information from the $1^{st}$ first-information set in two first-information sets, and selects $M_2$ pieces of first information from the $2^{nd}$ first-information set, thereby selecting $M_1+M_2=M$ pieces of first information in total.

Third, the network device generates the M indication values based on the M pieces of first information.

The network device respectively generates $M_i$ indication values for the $M_i$ pieces of first information, thereby generating the M indication values in total. For example, the network device generates $M_1$ indication values for the $M_1$ pieces of first information, and generates $M_2$ indication values for the $M_2$ pieces of first information.

It is assumed that M=16. Therefore, $M_1$=8, and $M_2$=8.

For each of the $M_i$ pieces of first information, if L in the first information meets that (L−1) is less than or equal to 7, the network device determines that an indication value corresponding to the first information is 14×(L−1)+S; or if L in the first information meets that (L−1) is greater than 7, the network device determines that the indication value corresponding to the first information is 14×(14−L+1)+(14−1−S). L is greater than 0 and less than or equal to (14−S), and S is greater than or equal to 0 and less than or equal to 13.

Fourth, the network device represents each of the M indication values by using six bits, to obtain the first indication information.

It should be noted that, because the network device selects the M pieces of first information from the P first-information sets, and each indication value is directly represented by using six bits, a value of an indication value may be greater than 64, and in this case, the indication value cannot be directly represented by using six bits. When the network device is an intelligent network device, and an indication value of first information in each first-information set is definitely within 64, this solution may be used.

In this embodiment of this application, the process in this application is described in detail by using an example in which the M indication parameters in the foregoing procedure shown in FIG. 5 are M indexes, there is a correspondence between the M indication parameters and M SLIVs, and there is a correspondence between the M SLIVs and the M indexes.

First, the network device determines the P first-information sets.

In this embodiment of this application, the P first-information sets may be protocol-specified, and each first-information set includes a maximum of 64 pieces of first information. For example, P=2 first-information sets are protocol-specified, and values of L in at least one of the P first-information sets may include 1, 2, 4, 7, and 14, and for another example, values of L in at least one of the P first-information sets may include 2, 4, 7, and 14.

In this embodiment of this application, values of L in each of the P first-information set are not limited, and fall within the protection scope of this application provided that the quantity of pieces of first information in each of the P first-information sets is less than or equal to 64.

Second, the network device selects the M pieces of first information.

The network device selects the $M_i$ pieces of first information from the $i^{th}$ information set in the P first-information sets, thereby selecting the M pieces of first information in total. For example, the network device selects $M_1$ pieces of first information from the $1^{st}$ first-information set in two first-information sets, and selects $M_2$ pieces of first information from the $2^{nd}$ first-information set, thereby selecting $M_1+M_2=M$ pieces of first information in total.

Third, the network device generates the M indication values based on the M pieces of first information.

The network device respectively generates $M_i$ indication values for the $M_i$ pieces of first information, thereby generating the M indication values in total. For example, the network device generates $M_1$ indication values for the $M_1$ pieces of first information, and generates $M_2$ indication values for the $M_2$ pieces of first information.

It is assumed that M=16. Therefore, $M_1$=8, and $M_2$=8.

For each of the $M_i$ pieces of first information, the M indication values may be generated in any one of the following two manners.

In a first manner, if L in the first information meets that (L−1) is less than or equal to 7, the network device determines that an indication value corresponding to the first information is 14×(L−1)+S; or if L in the first information meets that (L−1) is greater than 7, the network device determines that the indication value corresponding to the first information is 14×(14−L+1)+(14−1−S).

In a second manner, if L in the first information meets that (L−1) is less than 7, the network device determines that an indication value corresponding to the first information is 14×(L−1)+S; or if L in the first information meets that (L−1) is greater than or equal to 7, the network device determines that the indication value corresponding to the first information is 14×(14−L+1)+(14−1−S).

In the first manner and the second manner, L is greater than 0 and less than or equal to (14−S), and S is greater than or equal to 0 and less than or equal to 13.

Fourth, the network device determines the M indexes based on the M indication values.

In an example of this application, the network device may pre-determine a correspondence between $M_i$ indication values and $M_i$ indexes. The correspondence may be protocol-specified. The network device may determine, based on the correspondence, the $M_i$ indexes corresponding to the $M_i$ indication values. The protocol-specified correspondence between an indication value and an index is subsequently described in detail.

In this application, the $M_i$ indexes are in a subset of X indexes, and the $M_i$ indication values are in a subset of X indication values. The X indexes are in a one-to-one correspondence with the X indication values. Values of the X indexes are different from a value corresponding to the one index value, and X is a positive integer.

Fifth, the network device represents each of the M indexes by using six bits, to obtain the first indication information.

In another example in this application, the process in this application is described in detail by using an example in which the M indication parameters in the foregoing procedure shown in FIG. 5 are M indexes, there is a correspondence between the M indication parameters and M SLIVs, and there is a correspondence between the M SLIVs and the M indexes.

First, the network device determines the P first-information sets.

For a process in which the network device determines the P first-information sets, refer to descriptions of the foregoing procedure. Details are not described herein again.

Second, the network device determines an SLIV value corresponding to each piece of first information in each of the P first-information sets.

In an example of this application, the network device may obtain, based on formula (1.1) or formula (1.2), the SLIV corresponding to each piece of first information.

Third, the network device may establish a correspondence between an SLIV value and an index for each first-information set according to one of the following rules.

1. Sort SLIVs in ascending order (or in descending order) of L:
for same L, sort SLIVs in ascending order of S;
for same L, sort SLIVs in descending order of S;
for same L, sort SLIVs in ascending order of SLIVs; or for same L, sort SLIVs in descending order of SLIVs.

For the sorted SLIVs, an index is sequentially added to each SLIV value in a front-to-back order.

In an example of this application, it is assumed that P=2. For a correspondence between $M_1$ indexes and $M_1$ SLIVs, refer to the following Table 6. For a correspondence between $M_2$ indexes and $M_2$ SLIVs, refer to the following Table 7.

TABLE 6

| Index | Length | Start | SLIV |
|---|---|---|---|
| 0 | 1 | 0 | 0 |
| 1 | 1 | 1 | 1 |
| 2 | 1 | 2 | 2 |
| 3 | 1 | 3 | 3 |
| 4 | 1 | 4 | 4 |
| 5 | 1 | 5 | 5 |
| 6 | 1 | 6 | 6 |
| 7 | 1 | 7 | 7 |
| 8 | 1 | 8 | 8 |
| 9 | 1 | 9 | 9 |
| 10 | 1 | 10 | 10 |
| 11 | 1 | 11 | 11 |
| 12 | 1 | 12 | 12 |
| 13 | 1 | 13 | 13 |
| 14 | 2 | 0 | 14 |
| 15 | 2 | 1 | 15 |
| 16 | 2 | 2 | 16 |
| 17 | 2 | 3 | 17 |
| 18 | 2 | 4 | 18 |
| 19 | 2 | 5 | 19 |
| 20 | 2 | 6 | 20 |
| 21 | 2 | 7 | 21 |
| 22 | 2 | 8 | 22 |
| 23 | 2 | 9 | 23 |
| 24 | 2 | 10 | 24 |
| 25 | 2 | 11 | 25 |
| 26 | 2 | 12 | 26 |
| 27 | 3 | 0 | 28 |
| 28 | 3 | 1 | 29 |
| 29 | 3 | 2 | 30 |
| 30 | 3 | 3 | 31 |
| 31 | 3 | 4 | 32 |
| 32 | 3 | 5 | 33 |
| 33 | 3 | 6 | 34 |
| 34 | 3 | 7 | 35 |
| 35 | 3 | 8 | 36 |
| 36 | 3 | 9 | 37 |
| 37 | 3 | 10 | 38 |
| 38 | 3 | 11 | 39 |
| 39 | 4 | 0 | 42 |
| 40 | 4 | 1 | 43 |
| 41 | 4 | 2 | 44 |
| 42 | 4 | 3 | 45 |
| 43 | 4 | 4 | 46 |
| 44 | 4 | 5 | 47 |
| 45 | 4 | 6 | 48 |
| 46 | 4 | 7 | 49 |
| 47 | 4 | 8 | 50 |
| 48 | 4 | 9 | 51 |
| 49 | 4 | 10 | 52 |
| 50 | 5 | 0 | 56 |
| 51 | 5 | 1 | 57 |
| 52 | 5 | 2 | 58 |
| 53 | 5 | 3 | 59 |
| 54 | 5 | 4 | 60 |
| 55 | 5 | 5 | 61 |
| 56 | 5 | 6 | 62 |
| 57 | 5 | 7 | 63 |

TABLE 6-continued

| Index | Length | Start | SLIV |
|---|---|---|---|
| 58 | 5 | 8 | 64 |
| 59 | 5 | 9 | 65 |
| 60 | 6 | 0 | 70 |
| 61 | 6 | 1 | 71 |
| 62 | 6 | 2 | 72 |
| 63 | 6 | 3 | 73 |

TABLE 7

| Index | Length | Start | SLIV |
|---|---|---|---|
| 0 | 4 | 2 | 44 |
| 1 | 4 | 3 | 45 |
| 2 | 4 | 4 | 46 |
| 3 | 4 | 5 | 47 |
| 4 | 4 | 6 | 48 |
| 5 | 4 | 7 | 49 |
| 6 | 4 | 8 | 50 |
| 7 | 4 | 9 | 51 |
| 8 | 4 | 10 | 52 |
| 9 | 5 | 0 | 56 |
| 10 | 5 | 1 | 57 |
| 11 | 5 | 2 | 58 |
| 12 | 5 | 3 | 59 |
| 13 | 5 | 4 | 60 |
| 14 | 5 | 5 | 61 |
| 15 | 5 | 6 | 62 |
| 16 | 5 | 7 | 63 |
| 17 | 5 | 8 | 64 |
| 18 | 5 | 9 | 65 |
| 19 | 6 | 0 | 70 |
| 20 | 6 | 1 | 71 |
| 21 | 6 | 2 | 72 |
| 22 | 6 | 3 | 73 |
| 23 | 6 | 4 | 74 |
| 24 | 6 | 5 | 75 |
| 25 | 6 | 6 | 76 |
| 26 | 6 | 7 | 77 |
| 27 | 6 | 8 | 78 |
| 28 | 7 | 0 | 84 |
| 29 | 7 | 1 | 85 |
| 30 | 7 | 2 | 86 |
| 31 | 7 | 3 | 87 |
| 32 | 7 | 4 | 88 |
| 33 | 7 | 5 | 89 |
| 34 | 7 | 6 | 90 |
| 35 | 7 | 7 | 91 |
| 36 | 8 | 0 | 111 |
| 37 | 8 | 1 | 110 |
| 38 | 8 | 2 | 109 |
| 39 | 8 | 3 | 108 |
| 40 | 8 | 4 | 107 |
| 41 | 8 | 5 | 106 |
| 42 | 8 | 6 | 105 |
| 43 | 9 | 0 | 97 |
| 44 | 9 | 1 | 96 |
| 45 | 9 | 2 | 95 |
| 46 | 9 | 3 | 94 |
| 47 | 9 | 4 | 93 |
| 48 | 9 | 5 | 92 |
| 49 | 10 | 0 | 83 |
| 50 | 10 | 1 | 82 |
| 51 | 10 | 2 | 81 |
| 52 | 10 | 3 | 80 |
| 53 | 10 | 4 | 79 |
| 54 | 11 | 0 | 69 |
| 55 | 11 | 1 | 68 |
| 56 | 11 | 2 | 67 |
| 57 | 11 | 3 | 66 |
| 58 | 12 | 0 | 55 |
| 59 | 12 | 1 | 54 |
| 60 | 12 | 2 | 53 |
| 61 | 13 | 0 | 41 |
| 62 | 13 | 1 | 40 |
| 63 | 14 | 0 | 27 |

Fourth, the network device selects the M pieces of first information from the P first-information set.

In this embodiment of this application, a value of M may be 4, and a value of P may be 2. The network device selects two pieces of first information from the $1^{st}$ first-information set, and selects two pieces of first information from the $2^{nd}$ first-information set, thereby selecting four pieces of first information in total.

Fifth, the network device determines, based on the correspondence, the SLIV corresponding to each of the M pieces of first information.

Sixth, the network device determines, based on the correspondence between an SLIV and an index, an index corresponding to each of the M SLIVs.

Seventh, the network device represents each of the M indexes by using six bits.

In this embodiment of this application, values of the six bits are in a one-to-one correspondence with indexes. For example, 000 000 is used to correspond to an index 0, and 000 010 is used to correspond to an index 2.

For example, a value of M may be 4, and a value of P may be 2. The network device selects two pieces of first information from the $1^{st}$ first-information set, where corresponding indexes are "000 000" and "000 010", and corresponding starting locations and lengths are (0, 1) and (2, 1); and selects two pieces of first information from the $2^{nd}$ first-information set, where corresponding indexes are "000 000" and "000 010", and corresponding starting locations and lengths are (2, 4) and (4, 4).

Figure 4:
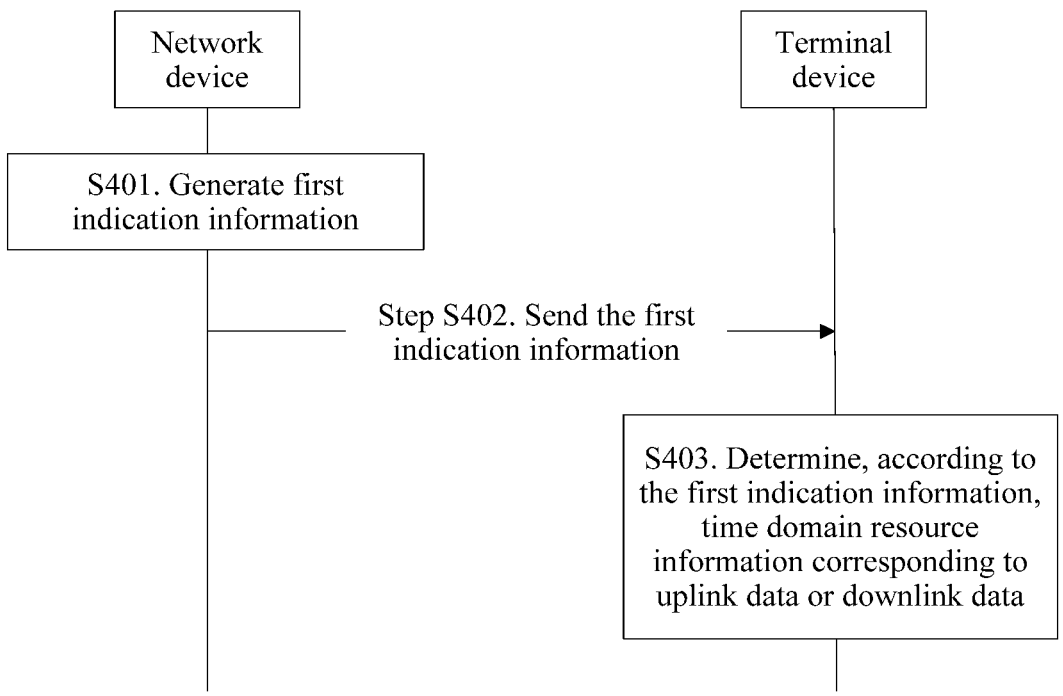
FIG. 4 is a schematic diagram of a communication method according to yet another embodiment of this application.

As shown in FIG. 4, this application provides a procedure of a communication method. A network device in the procedure may correspond to the network device 101 in FIG. 1, and a terminal device may correspond to the terminal device 102 in FIG. 1. The procedure is mainly used for a communication process between the network device and the terminal device when RRC signaling has not been established and the network device has not configured first information for the terminal device. The method includes the following steps.

Step S401: The network device generates first indication information, where the first indication information is used to indicate one of a plurality of pieces of predefined time domain resource information.

In an example of this application, each of the plurality of pieces of predefined time domain resource information may include at least one of a parameter K, a parameter S, a parameter L, and a mapping type parameter of uplink data or downlink data. There may be at least three pieces of predefined time domain resource information. When the time domain resource information includes the parameter L, the parameter L in each piece of time domain resource information may be two time domain symbols, four time domain symbols, or seven time domain symbols. The time domain symbol may include but is not limited to an OFDM symbol. When the time domain resource information includes the mapping type parameter, mapping type parameters in the at least three pieces of time domain resource information each are type 1. Alternatively, there may be four pieces of predefined time domain resource information. When the time domain resource information includes the parameter L, parameters L in the four pieces of time domain resource information may comprise two time domain symbols, seven time domain symbols, and i time domain symbols, where i is a positive integer greater than or equal to 7, and i represents a quantity of time domain symbols included in one slot, for example, when one slot includes 14 time domain symbols, a value of i is 14. When the time domain resource information includes the mapping type parameter, mapping type parameters in the four pieces of time domain resource information are type 1, type 1, type 1, and type 2. When the time domain resource information includes the parameter S, the parameter S may be predefined, for example, the parameter S may be predefined as 0. When the time domain resource information includes the parameter K, the parameter K may be predefined, and the parameter K may be predefined as 0.

In an example of this application, when each of the plurality of pieces of predefined time domain resource information does not include a parameter K of uplink data or downlink data, the parameter K is predefined, and the parameter K may be predefined as 0.

In an example of this application, when each of the plurality of pieces of predefined time domain resource information does not include a parameter S of uplink data or downlink data, the parameter S is predefined, and the parameter S may be predefined as 0.

In another example of this application, each of the plurality of pieces of predefined time domain resource information may include at least one of a parameter K, an indication parameter, and a mapping type parameter of uplink data or downlink data. In an embodiment of this application, when four pieces of time domain resource information are predefined, and the time domain resource information includes the indication parameter, indication parameters in the four pieces of time domain resource information are V1, V2, V3, and V4, and V1, V2, V3, and V4 each are a positive number. When a value of V1 is 0, it indicates that a starting location of time domain symbols occupied by the uplink data or the downlink data is 0 and that a quantity of occupied time domain symbols is 2. When a value of V2 is 1, it indicates that the starting location of the time domain symbols occupied by the uplink data or the downlink data is 0 and that the quantity of occupied time domain symbols is 4. When a value of V3 is 84, it indicates that the starting location of the time domain symbols occupied by the uplink data or the downlink data is 0 and that the quantity of occupied time domain symbols is 7. When a value of V4 is 27, it indicates that the starting location of the time domain symbols occupied by the uplink data or the downlink data is 0 and that the quantity of occupied time domain symbols is 14. When the time domain resource information includes the mapping type parameter, mapping type parameters in the four pieces of time domain resource information are type 1, type 1, type 1, and type 2. When there are at least three pieces of predefined time domain resource information, and the time domain resource information includes the indication parameter, indication parameters in the at least three pieces of time domain resource information are V, V2, and V3, where V1, V2, and V3 each are a positive number. When a value of V1 is 0, it indicates that a starting location of time domain symbols occupied by the uplink data or the downlink data is 0 and that a quantity of occupied time domain symbols is 2. When a value of V2 is 1, it indicates that the starting location of the time domain symbols occupied by the uplink data or the downlink data is 0 and that the quantity of occupied time domain symbols is 4. When a value of V3 is 84, it indicates that the starting location of the time domain symbols occupied by the uplink data or the downlink data is 0 and that the quantity of occupied time domain symbols is 7. When the time domain resource information includes the mapping type parameter, mapping type parameters in the at least three pieces of time domain resource information each are type 1.

In an example of this application, when each of the plurality of pieces of predefined time domain resource information does not include a parameter K of uplink data or downlink data, the parameter K is predefined, and the parameter K may be predefined as 0.

In an example of this application, when each of the plurality of pieces of predefined time domain resource information does not include a parameter S of uplink data or downlink data, the parameter S is predefined, and the parameter S may be predefined as 0.

In this embodiment of this application, the parameter K is used to represent a starting slot location occupied by the uplink data or the downlink data, the parameter S is used to represent a starting location of time domain symbols occupied by the uplink data or the downlink data, the parameter L is used to represent a quantity of time domain symbols occupied by the uplink data or the downlink data, the mapping type parameter is used to represent a mapping type of the uplink data or the downlink data, and the indication parameter is used to represent a starting location of time domain symbols occupied by the uplink data or the downlink data and a quantity of occupied time domain symbols.

Step S402: The network device sends first indication information, where the first indication information may be downlink control information (DCI).

Step S403: The terminal device determines, according to the first indication information, time domain resource information corresponding to the uplink data or the downlink data.

In an example of this application, when four time domain resources are predefined, and each time domain resource includes a parameter K, a parameter S, a parameter L, and a mapping type parameter, the parameter K is represented by K0, the parameter S is represented by "start", the parameter L is represented by "length", and the mapping type parameter is represented by a PDSCH mapping type. For the four predefined time domain resources, refer to the following Table 8.

TABLE 8

| Index | K0 | Start | Length | PDSCH mapping type |
|---|---|---|---|---|
| 0 | k1 | s1 | 2 | Type 1 |
| 1 | k2 | s2 | 4 | Type 1 |
| 2 | k3 | s3 | 7 | Type 1 |
| 3 | k4 | s4 | i (i > 7) | Type 2 |

In Table 8, K0 is used to determine a starting slot of the downlink data, and K0 may be predefined, for example, it is predefined that k1=k2=k3=k4=0. In this case, there may be no column K0 in the table.

In Table 8, a location of the "start" may be protocol-specific. The "start" may be determined based on a slot boundary, or may be determined based on a starting symbol location of a PDCCH, and this is not limited herein. When the "start" is 0, it indicates that the location of the "start" is the first symbol relative to the slot boundary, or that the location of the "start" is 0 relative to a start symbol of the PDCCH, or that the location of the "start" is 0 relative to an end symbol of the PDCCH. The "start" may be predefined, for example, it is predefined that s1=s2=s3=s4=0. In this case, there may be no column "start" in the table.

In Table 8, L may be predefined as 2, 4, 7, and i, which respectively indicate that the downlink data respectively occupies two time domain symbols, four time domain symbols, seven time domain symbols, and i time domain symbols in one slot. L is a length relative to the location of the "start".

In Table 8, the PDSCH mapping type may be predefined in the protocol, for example, the predefined mapping type may be type 1 or type 2.

In an example of this application, when four time domain resources are predefined, and each piece of time domain resource information may include a parameter K, an indication parameter, and a mapping type parameter of uplink data or downlink data, the parameter K may be represented by K0, the indication parameter may be represented by an SLIV, and the mapping type parameter is represented by a PDSCH mapping type. For the four predefined time domain resources, refer to the following Table 9.

TABLE 9

| Index | K0 | SLIV | PDSCH mapping type |
| --- | --- | --- | --- |
| 0 | k1 | V1 | Type 1 |
| 1 | k2 | V2 | Type 1 |
| 2 | k3 | V3 | Type 1 |
| 3 | k4 | V4 | Type 2 |

In Table 9, K0 is used to represent a starting slot of the downlink data, and K0 may be predefined, for example, it is predefined that k1=k2=k3=k4=0. In this case, there may be no column K0 in the table.

In Table 9, the SLIV value may also be predefined, and a starting location and a length corresponding to the SLIV meet the following condition: The starting location is protocol-specified, and may be determined based on a slot boundary, or may be determined based on a starting symbol location of a PDCCH. For example, when the starting location is 0, it indicates that the starting location is the first symbol relative to the slot boundary, or that the starting location is 0 relative to a starting symbol of the PDCCH, or that the starting location is 0 relative to an end symbol of the PDCCH. When the length is 2, 4, 7, or 14, it represents that a data length is two symbols, four symbols, or i symbols, and the i symbols represent a quantity of time domain symbols included in one slot.

In Table 9, the PDSCH mapping type may be predefined in the protocol, and may be predefined as type 1 or type 2.

Figure 6:
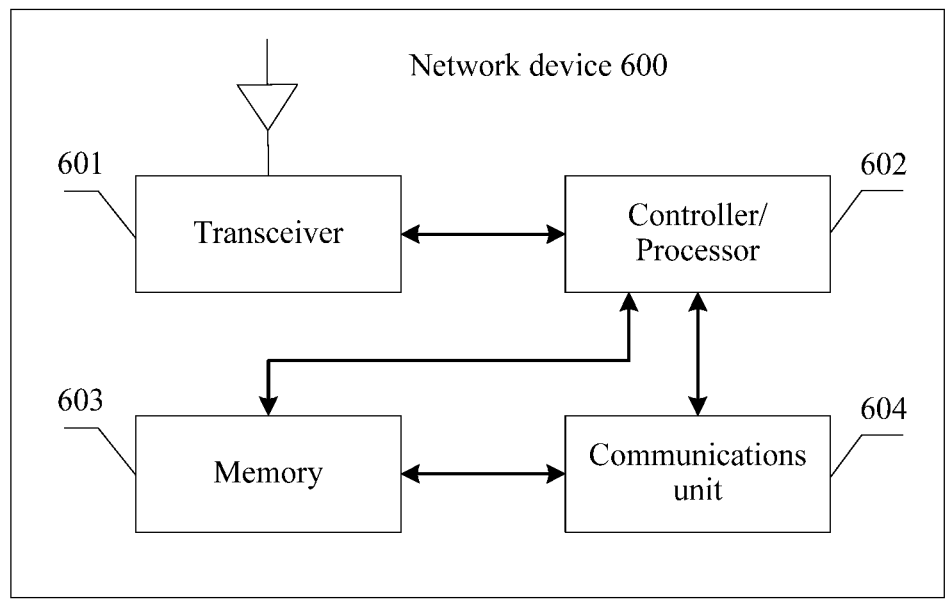
FIG. 6 is a schematic structural diagram of a network device according to some embodiments of this application.

FIG. 6 is a possible schematic structural diagram of the network device in the foregoing embodiments. A network device 600 is the network device 101 in the embodiment shown in FIG. 1 or the network device in the procedures shown in FIG. 2 to FIG. 5.

The network device includes a transceiver 601 and a controller/processor 602. The transceiver 601 may be configured to support information receiving and sending between the network device and the terminal device in the foregoing embodiments, and support radio communication between the terminal device and another terminal device. The controller/processor 602 may be configured to perform various functions for communicating with a terminal device or another network device. In an uplink, an uplink signal from the terminal device is received by an antenna, demodulated by the transceiver 601, and further processed by the controller/processor 602, to restore service data and signaling information that are sent by the terminal device. In a downlink, service data and a signaling message are processed by the controller/processor 602 and are demodulated by the transceiver 601 to generate a downlink signal, and the downlink signal is transmitted to the terminal device by using an antenna. The controller/processor 602 is further configured to determine M pieces of first information, where the first information includes starting location information S of time domain symbols occupied by uplink data or downlink data and quantity information L of the occupied time domain symbols, and S, L, and M each are an integer. The transceiver 601 is further configured to send the first information to the terminal device. The controller/processor 602 may be further configured to perform a processing process related to the network device in FIG. 2 to FIG. 5 and/or another process of the technology described in this application. The network device may further include a memory 603, and the memory 603 may be configured to store program code and data of the network device. The network device may further include a communication unit 604, and the communication unit 604 is configured to support communication between the network device and another network entity. For example, the communication unit 604 is configured to support communication between the network device and another communication network entity shown in FIG. 1, such as, the network device.

It can be understood that FIG. 6 shows merely a simplified design of the network device. In actual application, the network device may include any quantity of transmitters, receivers, processors, controllers, memories, communication units, and the like, and all network devices that can implement this application fall within the protection scope of the present application.

Figure 7:
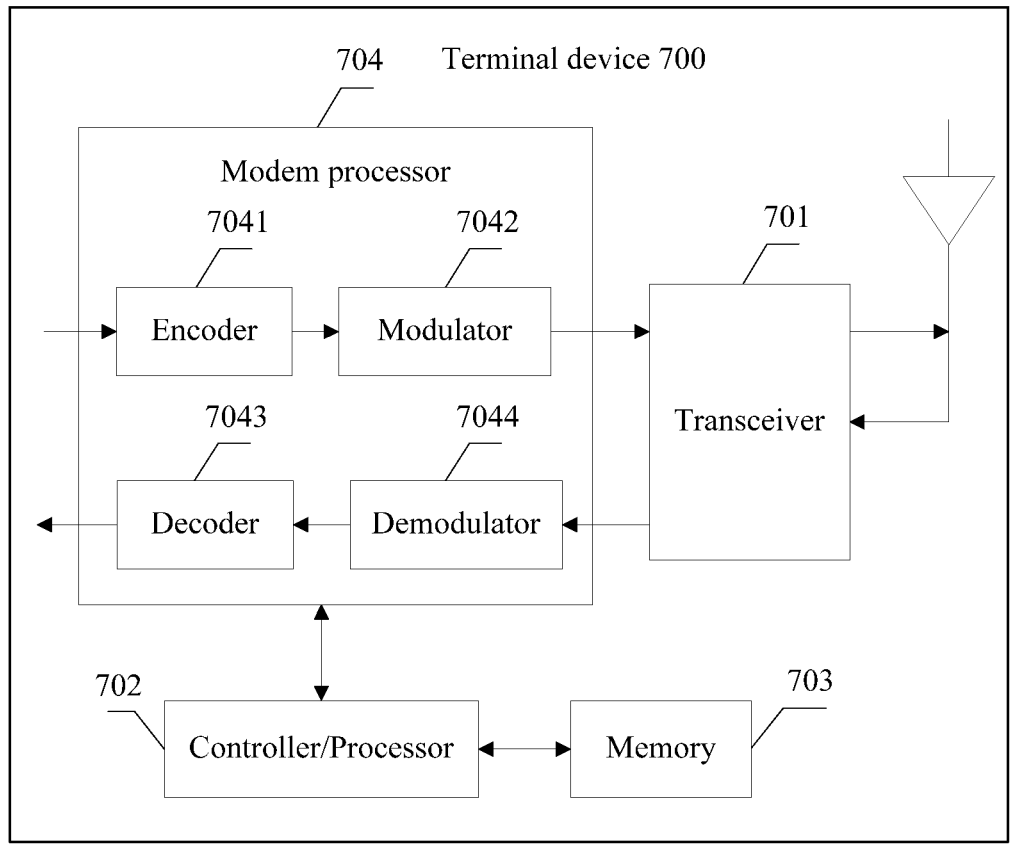
FIG. 7 is a schematic structural diagram of a terminal device according to some embodiments of this application.

FIG. 7 is a simplified schematic diagram of a possible design structure of the terminal device in the foregoing embodiments. A terminal device 700 may be the terminal device 102 in FIG. 1, or may be the terminal device shown in FIG. 2 to FIG. 5. The terminal device 700 includes a transceiver 701 and a controller/processor 702, and may further include a memory 703 and a modem processor 704.

The transceiver 701 adjusts (for example, through analog conversion, filtering, amplification, and up-conversion) an output sample and generates an uplink signal. The uplink signal is transmitted to the network device in the foregoing embodiments through an antenna. In a downlink, the antenna receives a downlink signal transmitted by a base station in the foregoing embodiments. The transceiver 701 adjusts (for example, through filtering, amplification, down-conversion, and digitization) the signal received from the antenna and provides an input sample. In the modem processor 704, an encoder 7041 receives service data and a signaling message that are to be sent in an uplink, and processes (for example, performs formatting, encoding, and interleaving on) the service data and the signaling message. A modulator 7042 further processes (for example, performs symbol mapping and modulation on) the encoded service data and the encoded signaling message, and provides an output sample. A demodulator 7044 processes (for example, demodulates) the input sample and provides symbol estimation. A decoder 7043 processes (for example, de-interleaves and decodes) the symbol estimation and provides decoded service data and a decoded signaling message that are to be sent to a terminal device. The encoder 7041, the modulator 7042, the demodulator 7044, and the decoder 7043 may be implemented by the composite modem processor 704. These units perform processing based on a radio access technology (for example, an access technology in LTE and another evolved system) used in a radio access network.

The controller/processor 702 controls and manages an action of the terminal device, and is configured to perform processing performed by the terminal device in the foregoing embodiments, for example, determine M pieces of first information. For example, the controller/processor 702 is configured to support the terminal device in executing content of the terminal device in FIG. 2 to FIG. 5. The memory 703 is configured to store program code and data used by the terminal device.

Figure 8:
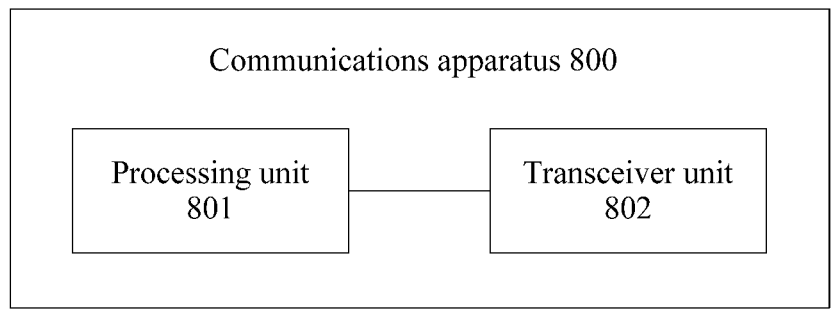
FIG. 8 and FIG. 9 are block diagrams of a communication apparatus according to some embodiments of this application.

As shown in FIG. 8, this application further provides a communication apparatus 800. The apparatus 800 includes:

a processing unit 801, configured to determine M pieces of first information, where the first information includes starting location information S of time domain symbols occupied by uplink data or downlink data and quantity information L of the occupied time domain symbols, and S, L, and M each are an integer; and a transceiver unit 802, configured to send first indication information, where the first indication information includes M indication parameters, each indication parameter is represented by seven bits, and the M indication parameters are in a one-to-one correspondence with the M pieces of first information; or the M pieces of first information are in a subset of N pieces of first information, N is an integer less than or equal to 64, the first information includes starting location information S of time domain symbols occupied by uplink data or downlink data and quantity information L of the occupied time domain symbols, and S, L, and M each are an integer. The first indication information includes M indication parameters, each indication parameter is represented by six bits, and the M indication parameters correspond to the M pieces of first information. For specific implementation processes of the processing unit 801 and the transceiver unit 802, refer to the foregoing method embodiments. Details are not described herein again.

Figure 9:
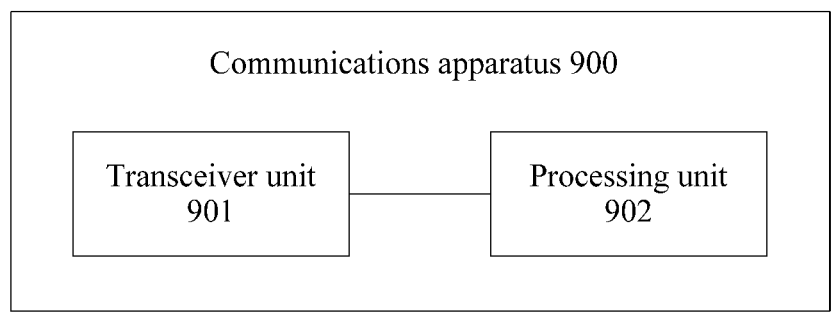

As shown in FIG. 9, this application further provides a communication apparatus 900. The apparatus 900 includes:

a transceiver unit 901, configured to receive first indication information, where the first indication information includes M indication parameters, and each indication parameter is represented by seven bits; and a processing unit 902, configured to determine M pieces of first information, where the M pieces of first information correspond to the M indication parameters, the first information includes starting location information S of time domain symbols occupied by uplink data or downlink data and quantity information L of the occupied time domain symbols, and S, L, and M each are an integer; or the M pieces of first information are in a one-to-one correspondence with the M indication parameters, the M pieces of first information are in a subset of N pieces of first information, N is an integer less than or equal to 64, the first information includes starting location information S of time domain symbols occupied by uplink data or downlink data and quantity information L of the occupied time domain symbols, and S, L, and M each are an integer. For specific implementation processes of the transceiver unit 901 and the processing unit 902, refer to the foregoing method embodiments. Details are not described herein again.

This application further provides a computer-readable storage medium, the computer-readable storage medium stores an instruction, and when the instruction is run on a computer, the computer is enabled to perform any one of the foregoing methods.

This application further provides a chip, and the chip is connected to a memory, and is configured to read and execute a software program stored in the memory, so as to implement any one of the foregoing methods.

Figure 10:
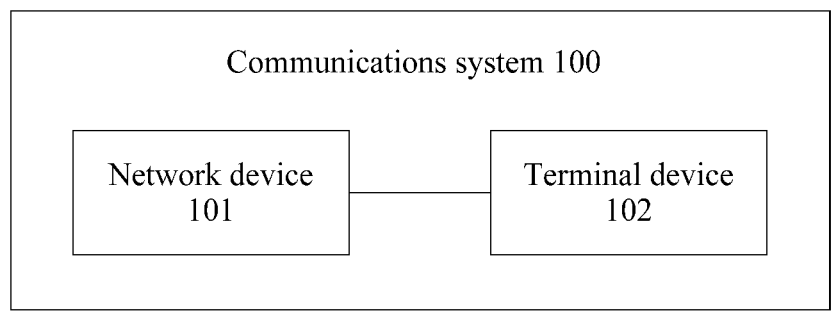
FIG. 10 is a block diagram of a communication system according to some embodiments of this application.

As shown in FIG. 10, this application further provides a communication system 100. The communication system 100 includes a network device 101 and a terminal device 102. For a working process of the network device 101, refer to the specific descriptions in the foregoing method embodiments and the apparatus embodiments. For a working process of the terminal device 102, refer to the specific descriptions in the foregoing method embodiments and the apparatus embodiments. Details are not described herein again.

Method or algorithm steps described in combination with the content disclosed in the present application may be implemented by hardware, or may be implemented by a processor by executing a software instruction. The software instruction may be generated by a corresponding software module. The software module may be located in a RAM memory, a flash memory, a ROM memory, an EPROM memory, an EEPROM memory, a register, a hard disk, a removable hard disk, a CD-ROM, or a storage medium of any other form known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in user equipment. Certainly, the processor and the storage medium may exist in the user equipment as discrete components.

In the foregoing one or more examples, functions described in the present application may be implemented by hardware, software, firmware, or any combination thereof. When the present application is implemented by software, the foregoing functions may be stored in a computer-readable medium or transmitted as one or more instructions or code in the computer-readable medium. The computer-readable medium includes a computer storage medium and a communication medium, where the communication medium includes any medium that enables a computer program to be transmitted from one place to another. The storage medium may be any available medium accessible to a general-purpose or dedicated computer.

The objectives, technical solutions, and benefits of the present application are further described in detail in the foregoing specific embodiments. It should be understood that the foregoing descriptions are merely specific embodiments of the present application, but are not intended to limit the protection scope of the present application. Any modification, equivalent replacement, or improvement made within the principle of the present application shall fall within the protection scope of the present application.

What is claimed is:

1. A communication method for use by a terminal device, comprising:

receiving first indication information from a network device, wherein the first indication information comprises M indication parameters indicating M pieces of configuration information respectively, wherein M≥1;

obtaining the M pieces of configuration information based on the M indication parameters, wherein $M_1$ pieces of configuration information in the M pieces of configuration information are in a one-to-one correspondence with $M_1$ indication parameters in the M indication parameters respectively, and all remaining pieces of configuration information in the M pieces of configuration information are represented by M-$M_1$ pieces of configuration information in the M pieces of configuration information and the M-$M_1$ pieces of configuration information are in a one-to-one correspondence with M-M$_1$ indication parameters in the M indication parameters respectively, wherein the M$_1$ pieces of configuration information are comprised in a first set of configuration information, and the M-M$_1$ pieces of configuration information are comprised in a second set of configuration information, wherein M and M$_1$ are each a positive integer, M is larger than M$_1$, and wherein the configuration information in the first set of configuration information and the configuration information in the second set of configuration information are partially different, wherein the first set of configuration information corresponds to a first mapping type, the second set of configuration information corresponds to a second mapping type, and the first mapping type and the second mapping type are different mapping types for mapping uplink data or downlink data to time domain resources, wherein the first mapping type represents that a demodulation reference signal (DMRS) is mapped to the first symbol in a scheduled uplink data channel or the first symbol in a scheduled downlink data channel, and the second mapping type represents that a DMRS is mapped to the third symbol or the fourth symbol of a slot; and performing uplink or downlink data transmission with the network device according to one or more of the M pieces of configuration information;

wherein an i$^{th}$ piece of configuration information in the M pieces of configuration information comprises information of a starting location S$_i$ and information of a quantity of time domain symbols L$_i$ that are occupied by uplink data or downlink data, wherein 1≤i≤M;

wherein each of the M indication parameters is represented by an indication value, and the indication value is calculated by:

for the i$^{th}$ piece of configuration information, the indication value is 14×(L$_i$-1)+S$_i$ when (L$_i$-1) is less than or equal to 7; or the indication value is 14×(14−L$_i$+1)+(14-1−S$_i$) when (L$_i$-1) is greater than 7; and wherein L$_i$ is an integer greater than 0 and less than or equal to (14−S$_i$), and S$_i$ is an integer greater than or equal to 0 and less than or equal to 13.

2. The method according to claim 1, wherein the first set of configuration information comprises N$_i$ pieces of configuration information, and the second set of configuration information comprises N$_2$ pieces of configuration information, and wherein 1≤N$_1$≤64, and 1≤N$_2$≤64.

3. The method according to claim 1, wherein the first indication information further comprises an indication that indicates which set of configuration information each of the M pieces of configuration information belongs to.

4. The method according to claim 1, wherein the first set of configuration information corresponds to a first mapping type of a physical downlink shared channel (PDSCH) and the second set of configuration information corresponds to a second mapping type of the PDSCH.

5. The method according to claim 1, wherein the value of L$_i$ (1≤i≤M) is in a range from 3 to 14.

6. The method according to claim 1, wherein the value of L$_i$ (1≤i≤M) is any one of 2, 4, or 7.

7. The method according to claim 1, wherein the first indication information is carried in higher layer signaling.

8. A communication apparatus, comprising a processor and a memory, wherein the memory is configured to store computer executable instructions, and the processor is configured to execute the computer executable instructions, to cause the apparatus to:

receive first indication information from a network device, wherein the first indication information comprises M indication parameters indicating M pieces of configuration information respectively, wherein M≥1;

obtain the M pieces of configuration information based on the M indication parameters, wherein M$_1$ pieces of configuration information in the M pieces of configuration information are in a one-to-one correspondence with M$_1$ indication parameters in the M indication parameters respectively, and all remaining pieces of configuration information in the M pieces of configuration information are represented by M-M$_1$ pieces of configuration information in the M pieces of configuration information and the M-M$_1$ pieces of configuration information are in a one-to-one correspondence with M-M$_1$ indication parameters in the M indication parameters respectively, wherein the M$_1$ pieces of configuration information are comprised in a first set of configuration information, and the M-M$_1$ pieces of configuration information are comprised in a second set of configuration information, wherein M and M$_1$ and Ma-are each a positive integer, M is larger than M$_L$ and wherein the configuration information in the first set of configuration information and the configuration information in the second set of configuration information are partially different, wherein the first set of configuration information corresponds to a first mapping type, the second set of configuration information corresponds to a second mapping type, and the first mapping type and the second mapping type are different mapping types for mapping uplink data or downlink data to time domain resources, wherein the first mapping type represents that a demodulation reference signal (DMRS) is mapped to the first symbol in a scheduled uplink data channel or the first symbol in a scheduled downlink data channel, and the second mapping type represents that a DMRS is mapped to the third symbol or the fourth symbol of a slot; and perform uplink or downlink data transmission with the network device according to one or more of the M pieces of configuration information;

wherein an i$^{th}$ piece of configuration information of the M pieces of configuration information comprises information of a starting location S$_i$ and information of a quantity of time domain symbols L$_i$ that are occupied by uplink data or downlink data, and 1≤i≤M;

wherein each of the M indication parameters is represented by an indication value, and the indication value is calculated by:

for the i$^{th}$ piece of configuration information, the indication value is 14×(L$_i$-1)+S$_i$ when (L$_i$-1) is less than or equal to 7; or the indication value is 14×(14−L$_i$+1)+(14-1−S$_i$) when (L$_i$-1) is greater than 7; and wherein L$_i$ is an integer greater than 0 and less than or equal to (14−S$_i$), and S$_i$ is an integer greater than or equal to 0 and less than or equal to 13.

9. The apparatus according to claim 8, wherein the first set of configuration information comprises N$_1$ pieces of configuration information, and the second set of configuration information comprises N2 pieces of configuration information, and wherein 1≤N$_1$≤64, and 1≤N$_2$≤64.

10. The apparatus according to claim 8, wherein the first indication information further comprises an indication that indicates which set of configuration information each of the M pieces of configuration information belongs to.

11. The apparatus according to claim 8, wherein the value of $L_i(1\leq i\leq M)$ is in a range from 3 to 14.

12. The apparatus according to claim 8, wherein the value of $L_i(1\leq i\leq M)$ is any one of 2, 4, or 7.

13. The apparatus according to claim 8, wherein the first indication information is carried in higher layer signaling.

14. The apparatus according to claim 8, wherein the apparatus is further configured to:
receive, from the network device, an indication indicating a mapping type of the downlink data channel is the first mapping type or the second mapping type.

15. A communication apparatus, comprising a processor and a memory, wherein the memory is configured to store computer executable instructions, and the processor is configured to execute the computer executable instructions, to cause the apparatus to:
determine M pieces of configuration information, comprising:
selecting $M_1$ pieces of configuration information from a first set of configuration information, and selecting $M-M_1$ pieces of configuration information from a second set of configuration information, wherein the first set of configuration information corresponds to a first mapping type, the second set of configuration information corresponds to a second mapping type, and the first mapping type and the second mapping type are different mapping types for mapping uplink data or downlink data to time domain resources, wherein the first mapping type represents that a demodulation reference signal (DMRS) is mapped to the first symbol in a scheduled uplink data channel or the first symbol in a scheduled downlink data channel, and the second mapping type represents that a DMRS is mapped to the third symbol or the fourth symbol of a slot, and wherein the configuration information in the first set of configuration information and the configuration information in the second set of configuration information are partially different;
wherein $M\geq 1$, M and $M_1$ are each a positive integer, M is larger than $M_1$, an $i^{th}$ piece of configuration information in the M pieces of configuration information comprises information of a starting location $S_i$ and information of a quantity of time domain symbols $L_i$ that are occupied by uplink data or downlink data, and $1\leq i\leq M$;

sending first indication information to a terminal device, wherein the first indication information comprises M indication parameters indicating the M pieces of configuration information respectively; and
performing uplink or downlink data transmission with the terminal device according to one or more of the M pieces of configuration information,
wherein the $M_1$ pieces of configuration information in the M pieces of configuration information are in a one-to-one correspondence with $M_1$ indication parameters in the M indication parameters respectively, and all remaining pieces of configuration information in the M pieces of configuration information are represented by the $M-M_1$ pieces of configuration information in the M pieces of configuration information and the $M-M_1$ pieces of configuration information are in a one-to-one correspondence with $M-M_1$ indication parameters in the M indication parameters respectively;
wherein each of the M indication parameters is represented by an indication value, and the indication value is calculated by:
for the $i^{th}$ piece of configuration information,
the indication value is $14\times(L_i-1)+S_i$ when $(L_i-1)$ is less than or equal to 7; or
the indication value is $14\times(14-L_i+1)+(14-1-S_i)$ when $(L_i-1)$ is greater than 7; and
wherein $L_i$ is an integer greater than 0 and less than or equal to $(14-S_i)$, and $S_i$ is an integer greater than or equal to 0 and less than or equal to 13.

16. The apparatus according to claim 15, wherein the first set of configuration information comprises $N_1$ pieces of configuration information, and the second set of configuration information comprises N2 pieces of configuration information, and wherein $1\leq N_1\leq 64$, and $1\leq N_2\leq 64$.

17. The apparatus according to claim 15, wherein the first indication information further comprises an indication that indicates which set of configuration information each of the M pieces of configuration information belongs to.

18. The apparatus according to claim 15, wherein the value of $L_i(1\leq i\leq M)$ is in a range from 3 to 14.

19. The apparatus according to claim 15, wherein the value of $L_i(1\leq i\leq M)$ is any one of 2, 4, or 7.

20. The apparatus according to claim 15, wherein the first indication information is carried in higher layer signaling.

* * * * *

UNITED STATES PATENT AND TRADEMARK OFFICE
CERTIFICATE OF CORRECTION

PATENT NO. : 11,606,177 B2
APPLICATION NO. : 16/924099
DATED : March 14, 2023
INVENTOR(S) : Ma et al.

It is certified that error appears in the above-identified patent and that said Letters Patent is hereby corrected as shown below:

In the Claims

Claim 2: Column 39, Line 44: "of configuration information comprises $N_i$ pieces of con-" should read -- of configuration information comprises $N_1$ pieces of con- --.

Claim 8: Column 40, Lines 22-23: "of configuration information, wherein M and $M_1$ and Ma-are each a positive integer, M is larger than $M_L$ and" should read -- of configuration information, wherein M and $M_1$ are each a positive integer, M is larger than $M_1$, and --.

Signed and Sealed this
Twentieth Day of June, 2023

*Katherine Kelly Vidal*

Katherine Kelly Vidal
*Director of the United States Patent and Trademark Office*